(12) United States Patent
Kato

(10) Patent No.: US 9,122,571 B2
(45) Date of Patent: Sep. 1, 2015

(54) APPARATUS AND METHOD FOR MANAGING DATA ACCESS COUNT

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/086,225

(22) Filed: Nov. 21, 2013

(65) Prior Publication Data

US 2014/0215169 A1    Jul. 31, 2014

(30) Foreign Application Priority Data

Jan. 30, 2013  (JP) ................................. 2013-015392

(51) Int. Cl.
*G06F 3/00* (2006.01)
*G06F 11/00* (2006.01)
G06F 17/30 (2006.01)
G06F 3/06 (2006.01)

(52) U.S. Cl.
CPC *G06F 11/00* (2013.01); *G06F 3/06* (2013.01); *G06F 3/061* (2013.01); *G06F 17/30371* (2013.01); *G06F 2201/88* (2013.01)

(58) Field of Classification Search
CPC  G06F 17/30371; G06F 2201/88; G06F 3/061
See application file for complete search history.

(56) References Cited

U.S. PATENT DOCUMENTS

2012/0016916 A1 * 1/2012 Xia et al. ...................... 707/827

FOREIGN PATENT DOCUMENTS

JP    2008-158661    7/2008
JP    2011-100419    5/2011

OTHER PUBLICATIONS

Ahmed Metwally, et al., "Efficient Computation of Frequent and Top-k Elements in Data Streams", International Conference on Database Theory (ICDT), LNCS 3363, 2005, 15 pages.

* cited by examiner

*Primary Examiner* — Zachary K Huson
(74) *Attorney, Agent, or Firm* — Oblon, McClelland, Maier & Neustadt, L.L.P.

(57) ABSTRACT

An apparatus counts, for each piece of data, an access count indicating a number of times of access to the each piece of data for every unit time so as to store a management information element including the access count and identification information identifying the each piece of data. The apparatus deletes, from the plurality of management information elements stored in a memory, a management information element that includes the access count having a value minimum among the plurality of management information elements, when a number of the plurality of management information elements reaches a predetermined number. The apparatus determines whether there is a piece of data that satisfies a condition related to rapid increase of access, based on the access counts included in the plurality of management information elements.

12 Claims, 26 Drawing Sheets

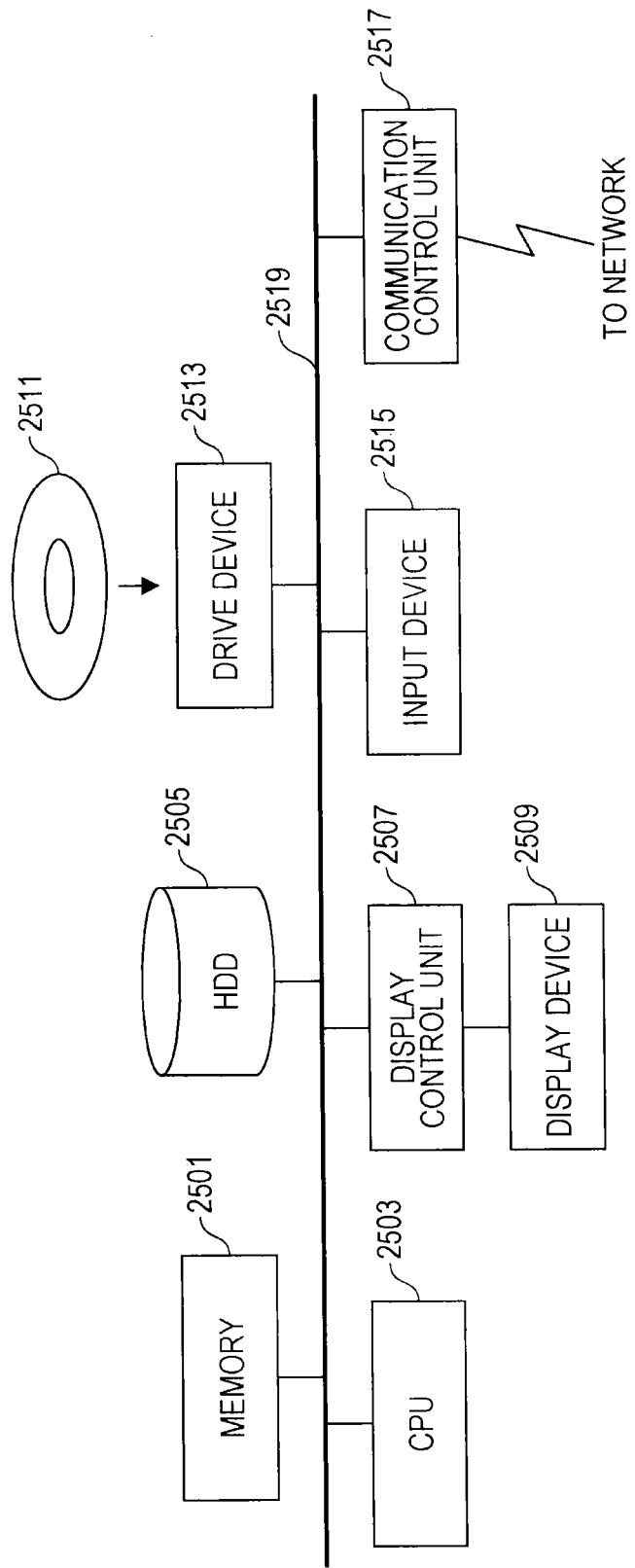

APPARATUS AND METHOD FOR MANAGING DATA ACCESS COUNT

CROSS-REFERENCE TO RELATED APPLICATION

This application is based upon and claims the benefit of priority of the prior Japanese Patent Application No. 2013-015392, filed on Jan. 30, 2013, the entire contents of which are incorporated herein by reference.

FIELD

The embodiment discussed herein is related to an apparatus and method for managing data access count.

BACKGROUND

A distributed storage system is a storage system which includes a plurality of servers provided with a storage device such as a hard disk drive (HDD) and a solid state drive (SSD), for example. In recent years, research and development of a distributed storage system have been extensively carried out so as to manipulate large quantities of data called big data.

The distributed storage system is characterized in that a performance and capacity thereof is easily expanded and high reliability is secured by replication of data (called a replica, as well). For example, it is possible to easily handle variation of a load which is imposed on the distributed storage system and variation of total capacity of data by increasing/decreasing the number of servers. Further, a plurality of servers holds replicas of the same data to make the data redundant, enabling improvement of availability and durability of the data.

In such distributed storage system, performance degradation caused by a load pattern which is called a spike has been a problem. A spike is such load pattern that access is concentrated only on specific data. Since access is concentrated only on specific data, access is performed only to nodes which hold a replica of the data even if the number of servers is simply increased. Thus, it is difficult to avoid performance degradation.

In order to avoid performance degradation, it is preferable to detect data which is a cause of a spike in a short period of time (for example, approximately several seconds) to increase replicas of the data. However, a spike does not frequently occur but occurs rarely, and it is not favorable that many resources are routinely consumed to detect a spike. Accordingly, it is preferable to efficiently detect data which is a cause of a spike without using many resources.

Regarding analysis of access frequency, an algorithm called the space-saving algorithm is widely employed. The space-saving algorithm is an algorithm with which popularity of data is obtained by using an error E. The analysis of access frequency in which the space-saving algorithm is used is described with reference to examples illustrated in FIGS. 1 to 3.

FIG. 1 is a schematic diagram illustrating an example of buckets and elements used for a space-saving algorithm. FIG. 1 illustrates buckets 101 to 103 and elements 104 to 107. A bucket is a piece of information used for a mechanism (for example, an instance) which manages elements, of which counter values are same as each other, by using an element list. An element is a piece of information used for a mechanism (for example, an instance) which manages popularity of data and includes identification information of data and a value of a counter for the date. Hereinafter, "element" will be also expressed as "management information element" so as to imply that "element" is a piece of information for management. Here, an upper limit of the number of elements is $1/\epsilon$ and is fixed. As a value of the counter for an element which is managed by a bucket is larger, the bucket is arranged on a more right side and elements including same values of the counter are connected by a list.

A case in which a main page is accessed in a state depicted in FIG. 1 is described with reference to FIG. 2. When a main page is accessed, a value of the counter for the element 106 is incremented, and the element 106 turns to an element 108. At this point, there is no elements which are managed by the bucket 102 and the bucket 102 is not used, so that the bucket 102 is merged into the bucket 103.

A case in which an article of a work of Mr. M is accessed in a state which is illustrated on the lower half of FIG. 2 is described with reference to FIG. 3. Here, it is assumed that an upper limit $1/\epsilon$ of the number of elements in FIG. 3 is 4. There are no elements about the article of a work of Mr. M in the state illustrated on the lower half of FIG. 2. However, the number of elements has reached 4 which is the upper limit, so that an element may not be simply added. Therefore, in the space-saving algorithm, the element 104 having the minimum value of the counter (an element related to a search page, in this example) among the elements is deleted and an element 110 related to the work of Mr. M is added. Here, a value of the counter for the element 110 is "91" which is obtained by incrementing the value of the counter for the element 104 by 1. Further, a bucket 109 for managing elements of which a value of the counter is 91 is added between the bucket 101 and the bucket 103.

In the space-saving algorithm, the number of elements which are used for counting the number of access is $1/\epsilon$ and is fixed. Therefore, even in a case in which a wide variety of data such as big data are accessed, for example, a used amount of resources (for example, a memory) stays constant. However, a value of a counter is a cumulative total of the number of times of access from a time point at which execution of the space-saving algorithm is started to a current time point. That is, the number of times of access including the number of times of access during time in which data is unpopular is counted. Therefore, in a case in which the number of access is rapidly increased after the space-saving algorithm is executed for a long period of time, it may be difficult to deal with the case.

Further, there is the following technique regarding management of an access history. Specifically, an access history management unit generates an access history for every file on a main memory. When a plurality of access history cells of which generated dates are same as each other are present in one access history chain after elapse of a certain period of time from generation of an access history, the access history management unit integrates these access history cells to generate a single access history cell. Further, after a predetermined period of time further elapses, the access history management unit deletes an access history from the access history cell chain. However, in this technique, when many files are accessed before access histories are integrated or deleted, large quantities of data are temporarily held. That is, a large quantity of resources is consumed, thereby impairing efficiency.

Ahmed Metwally, Divyakant Agrawal, and Amr El Abbadi, "Efficient Computation of Frequent and Top-k Elements in Data Streams", ICDT'05 *Proceedings of the 10th international conference on Database Theory*, p. 398-412, 2005 is an example of related art.

Japanese Laid-open Patent Publication No. 2011-100419 is another example of related art.

SUMMARY

According to an aspect of the invention, an apparatus counts, for each piece of data, an access count indicating a number of times of access to the each piece of data for every unit time so as to store, in a memory, a management information element including the access count and identification information identifying the each piece of data. The apparatus deletes, from the plurality of management information elements stored in the memory, a management information element that includes the access count having a value minimum among the plurality of management information elements, when a number of the plurality of management information elements reaches a predetermined number. The apparatus determines whether there is a piece of data that satisfies a condition related to rapid increase of access, based on the access counts included in the plurality of management information elements.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 26 is a diagram illustrating an example of hardware configuration, according to an embodiment.

DESCRIPTION OF EMBODIMENT

Figure 4:
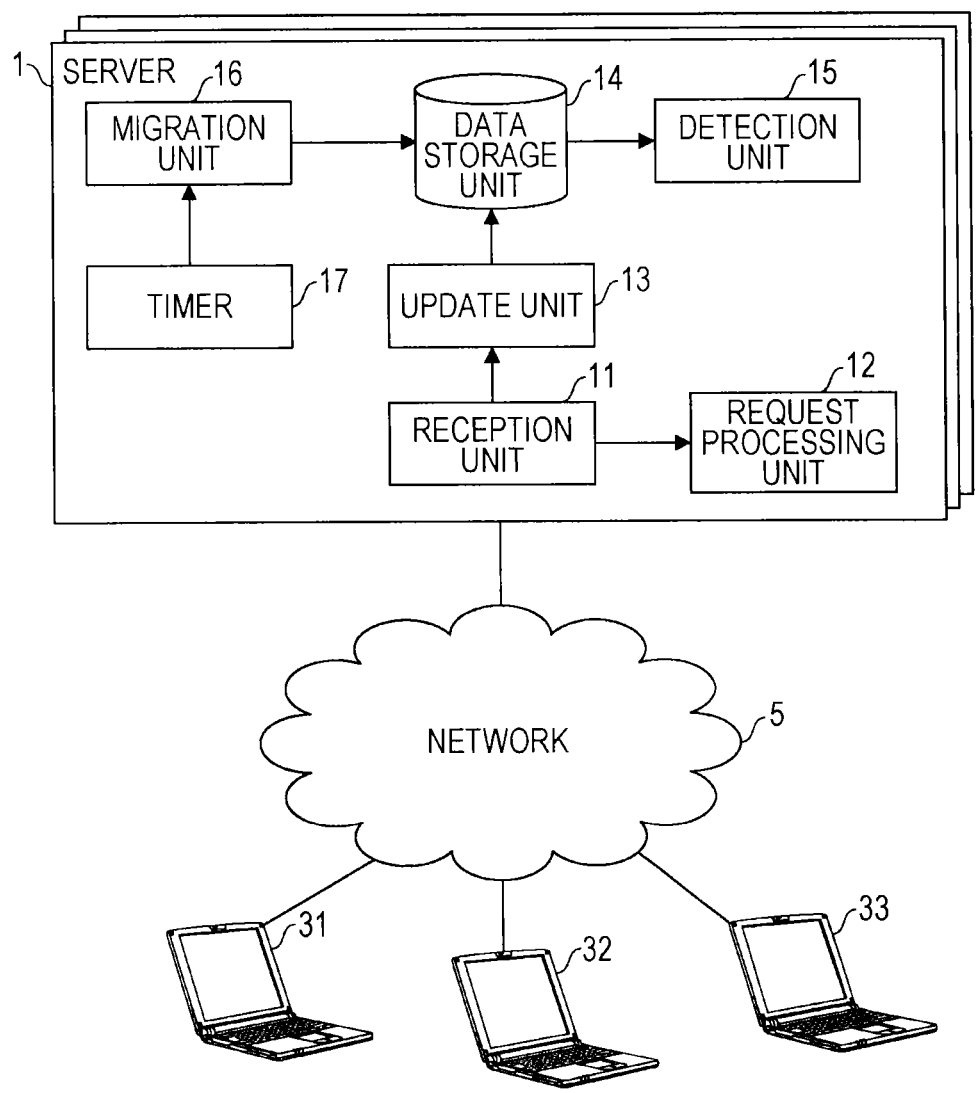
FIG. 4 is a diagram illustrating an example of a configuration of a system, according to an embodiment.

FIG. 4 is a diagram illustrating an example of a configuration of a system, according to an embodiment. To a network 5 which is Internet, for example, user terminals 31 to 33 and a server 1 are connected. The user terminals 31 to 33 transmit a request for demanding browse of a web page and the like to the server 1. In response to this request, the server 1 transmits a response including data of a web page and the like to the user terminals 31 to 33. The user terminals 31 to 33 display the data included in the response which is received from the server 1, on a display screen or the like of the user terminals 31 to 33, enabling a user to browse the web page and the like. A plurality of servers 1 are provided for load distribution.

The server 1 may include a reception unit 11, a request processing unit 12, an update unit 13, a data storage unit 14, a detection unit 15, a migration unit 16, and a timer 17.

The reception unit 11 outputs a request which is received from the user terminals 31 to 33 to the request processing unit 12 and the update unit 13. When the request processing unit 12 receives a request from the reception unit 11, the request processing unit 12 executes processing corresponding to the request. For example, the request processing unit 12 reads out data designated in the request from a HDD, which is not depicted, and the like and outputs the data to the user terminal which is a transmission source of the request. The update unit 13 updates data which is stored in the data storage unit 14 by using information included in a request (identification information of data to be accessed, for example) which is received from the reception unit 11. The timer 17 notifies the migration unit 16 of elapse of unit time every time predetermined unit time (several seconds, for example) elapses. The migration unit 16 executes processing for updating data which is stored in the data storage unit 14 every time unit time elapses. The detection unit 15 detects data that has caused a spike, based on data stored in the data storage unit 14.

Figure 1:
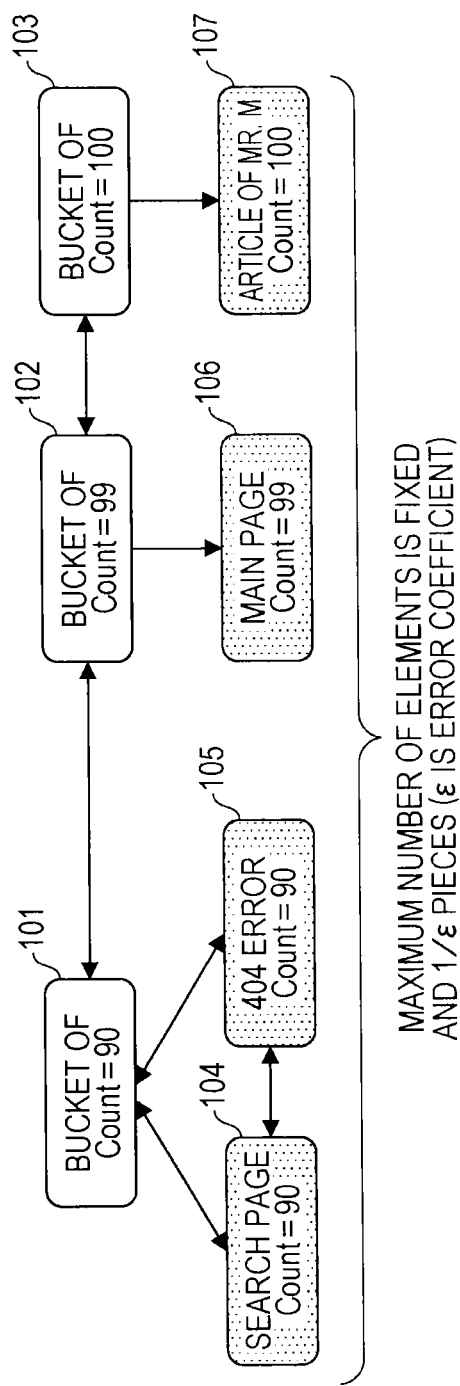
FIG. 1 is a schematic diagram illustrating an example of buckets and elements used for a space-saving algorithm.
Figure 2:
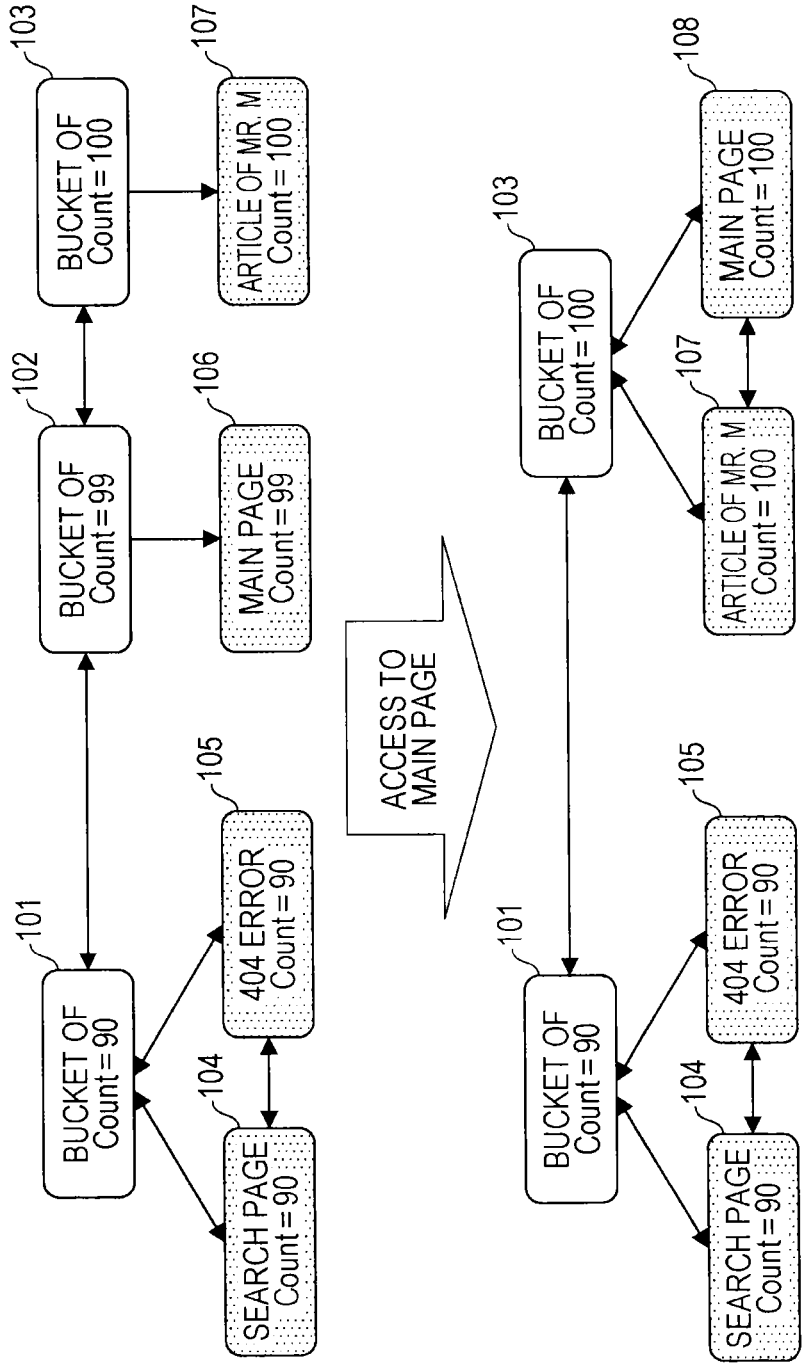
FIG. 2 is a diagram illustrating an example of change in buckets and elements used for a space-saving algorithm.
Figure 3:
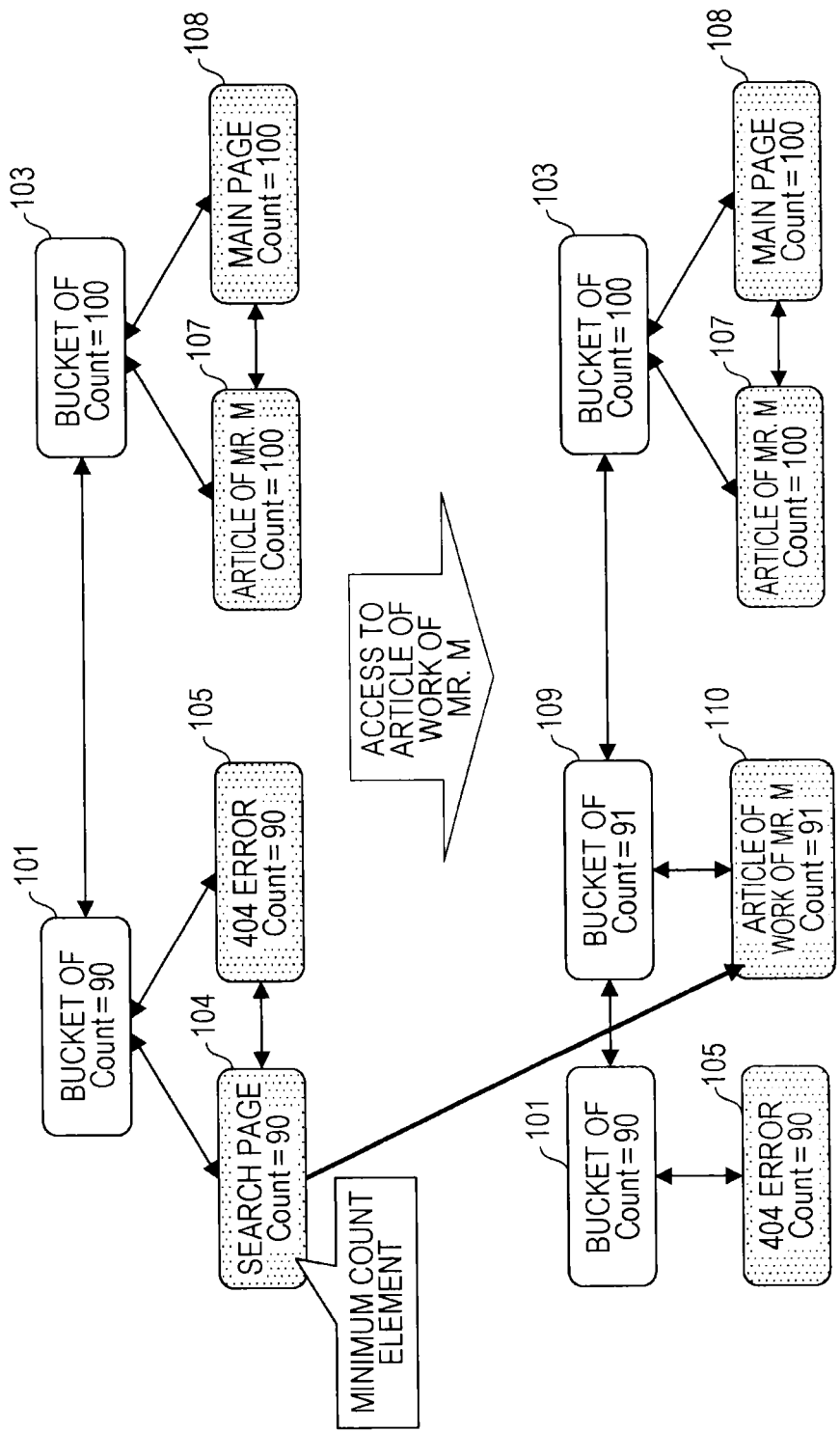
FIG. 3 is a diagram illustrating an example of change in buckets and elements used for a space-saving algorithm.
Figure 5:
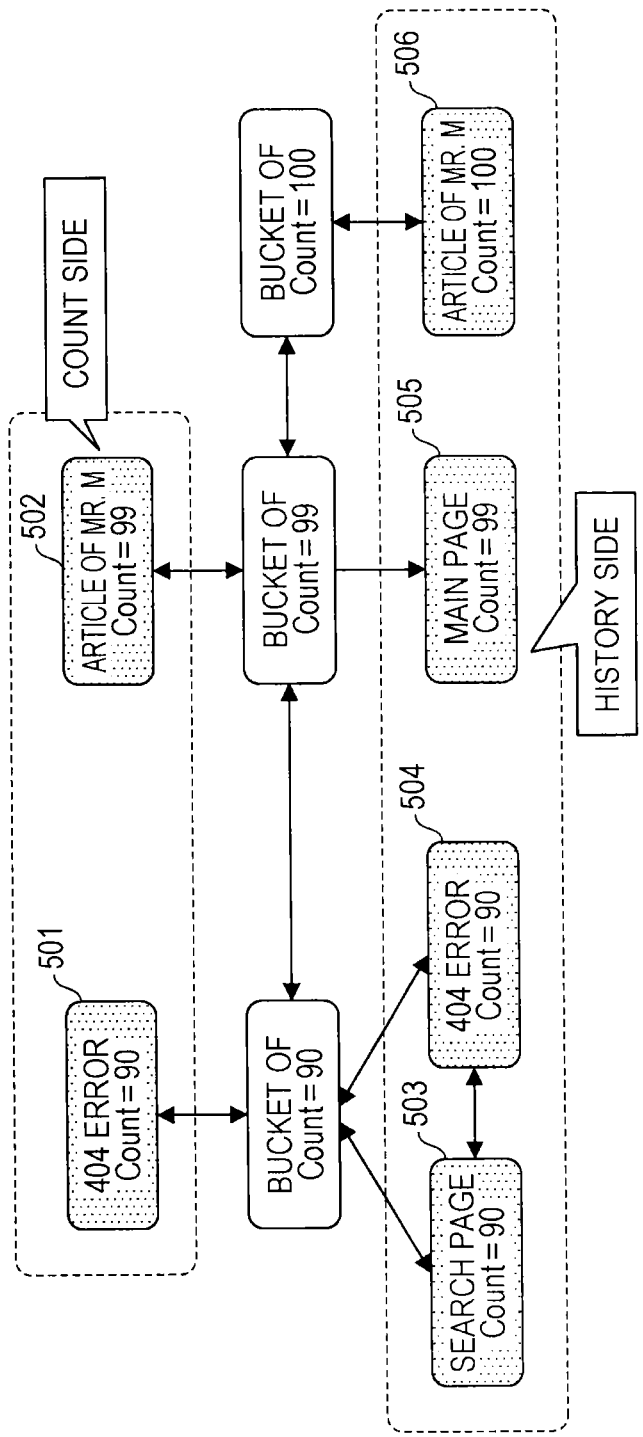
FIG. 5 is a diagram illustrating an example of processing which is performed every time unit time elapses, according to an embodiment.
Figure 6:
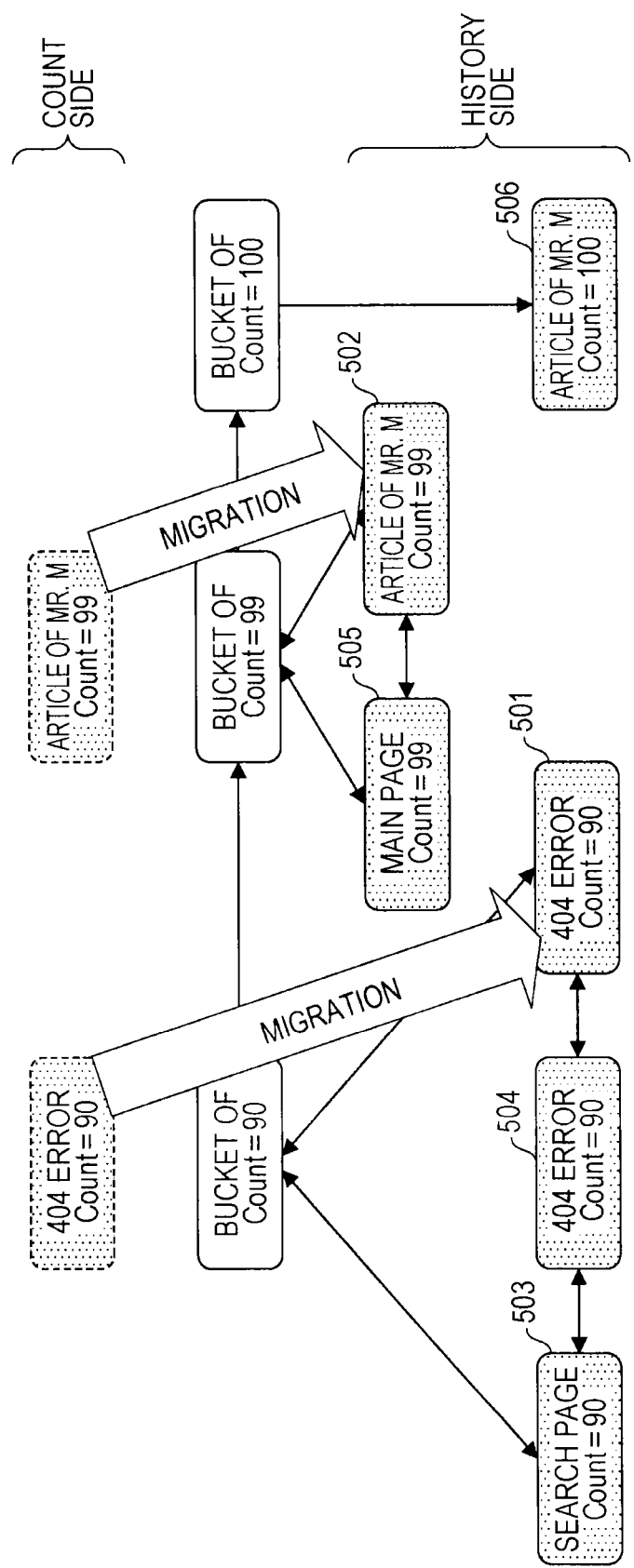
FIG. 6 is a diagram illustrating an example of processing which is performed every time unit time elapses, according to an embodiment.
Figure 7:
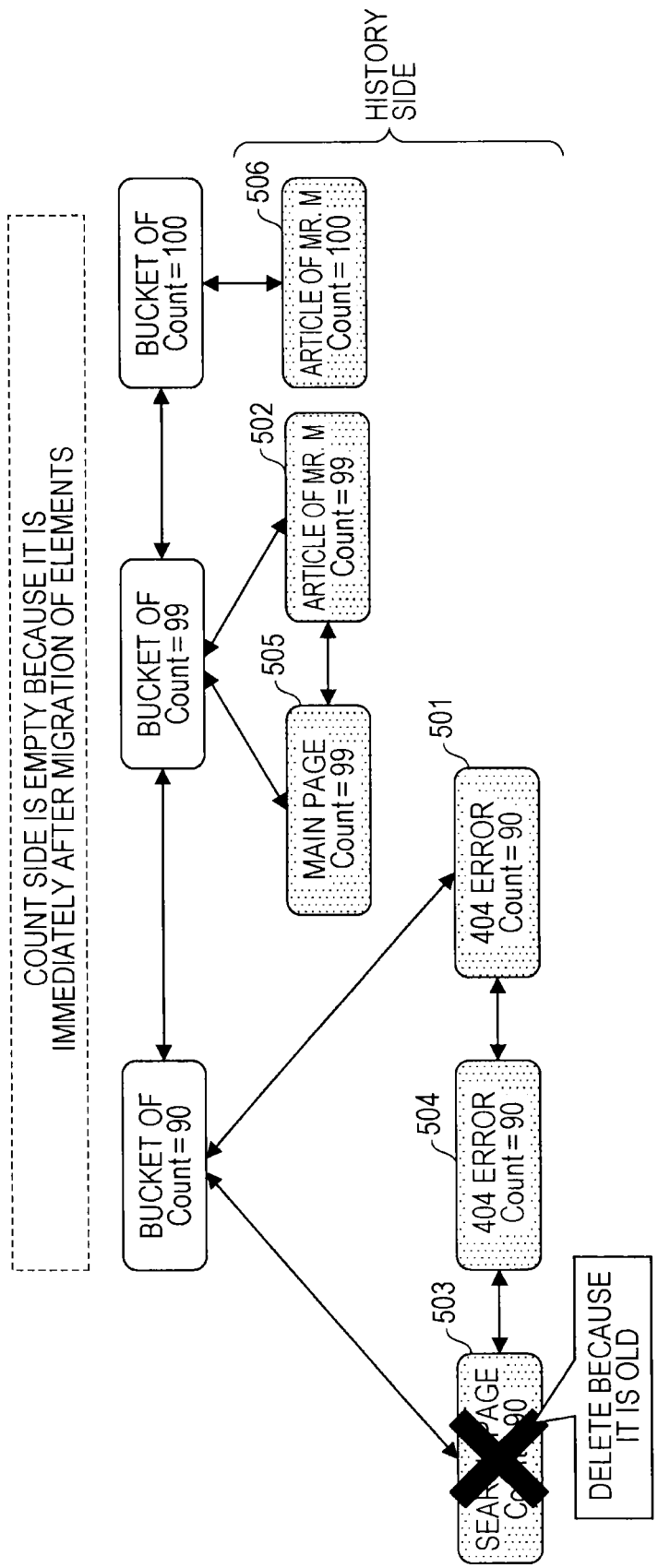
FIG. 7 is a diagram illustrating an example of processing which is performed every time unit time elapses, according to an embodiment.

Processing which is performed every time unit time elapses is now described with reference to FIGS. 5 to 7. In the embodiment, the idea of the space-saving algorithm which has been described with reference to FIGS. 1 to 3 is incorporated. However, the embodiment is different from a normal space-saving algorithm and elements in the embodiment are categorized into two groups. As depicted in FIG. 5, elements are categorized into a first group which is called a count side and a second group which is called a history side. Elements belonging to the count side are used for counting the number of times of access, and elements belonging to the history side are used for holding a history of the number of times of access. In FIG. 5, elements belonging to the count side are elements 501 and 502 and elements belonging to the history side are elements 503 to 506. In the following description, it is assumed that elements illustrated above buckets are elements of the count side and elements illustrated below buckets are elements of the history side.

In the count side, the number of times of access for unit time is counted for every piece of data. In the example of FIG. 5, data of "404 error" is accessed 90 times and data of "article of Mr. M" is accessed 99 times. When the unit time elapses, the elements belonging to the count side are migrated to the history side by the migration unit 16. In the example of FIG. 6, the elements 501 and 502 belonging to the count side are migrated to the history side. Since there exist elements other than the element 501, whose value of a counter is 90, the element 501 is coupled to the right side of the element 504. Further, as depicted in FIG. 7, the element 503 which is an old element is deleted when the unit time elapses. Here, an "old element" is an element which is generated predetermined time (time having a length several times the length of the unit time, for example) before or earlier. In FIG. 7, there are no elements belonging to the count side, but an element is generated in the count side when data is accessed during the next unit time.

An element and a bucket are described with reference to FIGS. 8 and 9. An element according to the embodiment is realized by a class 801 depicted in FIG. 8. 802 of FIG. 8 denotes an example of values of an instance which is generated from the class 801. In this example, the values of the instance include identification information of data, a value of a counter, identification information of an element which is adjacently connected to this element in a forward direction of the element list of a count side when this element belongs to the count side, identification information of an element which is adjacently connected to this element in a backward direction of the element list of the count side when this element belongs to the count side, information of a bucket which manages elements, identification information of an element which is adjacently connected to this element in a forward direction of the element list of a history side when this element belongs to the history side, and identification information of an element which is adjacently connected to this element in a backward direction of the element list when this element belongs to the history side.

Figure 9:
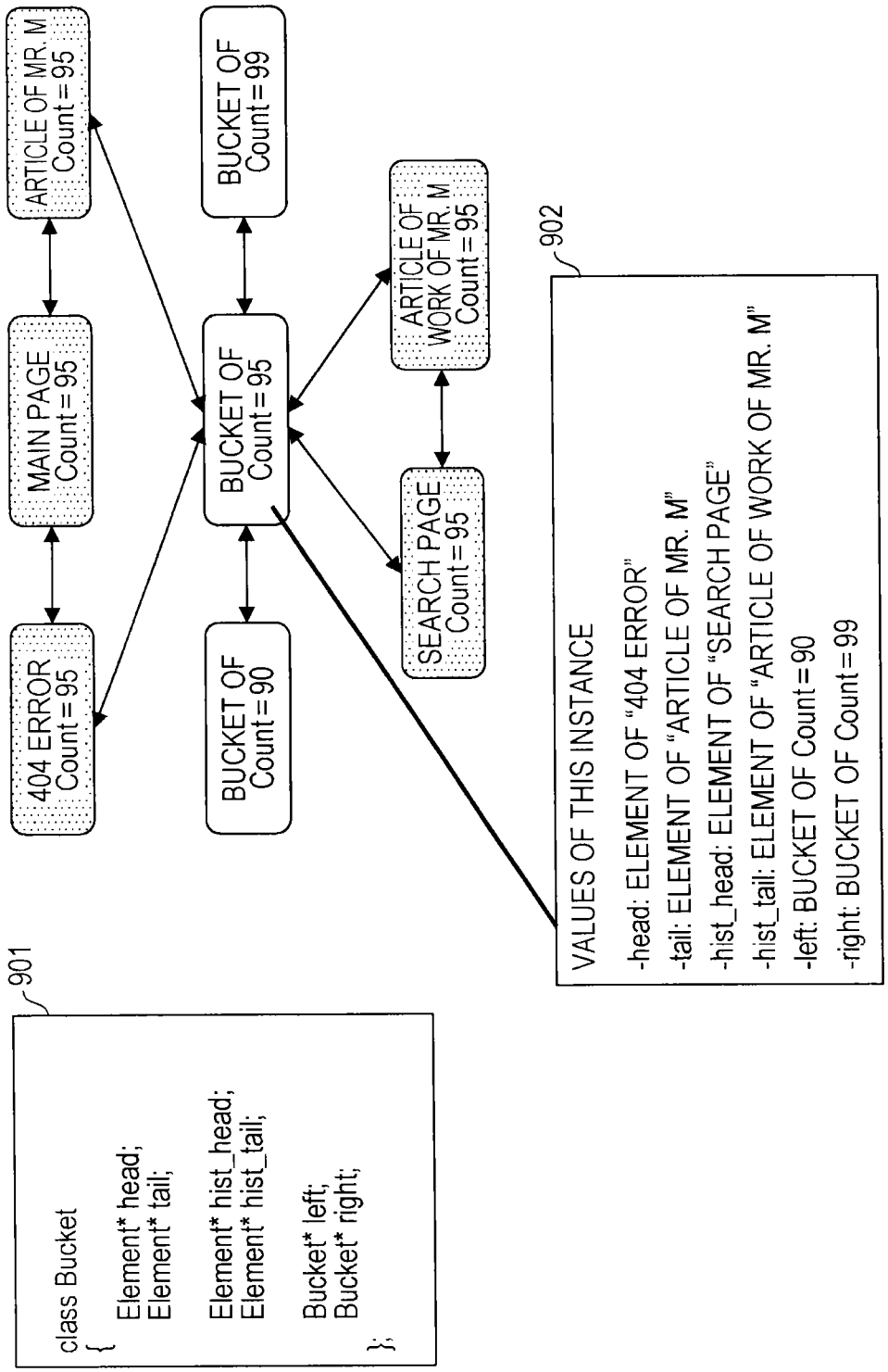
FIG. 9 is a diagram illustrating an example of a bucket, according to an embodiment.

Further, a bucket according to the embodiment may be realized by a class 901 depicted in FIG. 9. 902 of FIG. 9 denotes an example of values of an instance which is generated from the class 901. In this example, the values of the instance include identification information of a head element of the element list in a count side, identification information of a tail-end element of the element list in the count side, identification information of a head element of the element list in a history side, identification information of a tail-end element of the element list in the history side, identification information of a bucket which is adjacently connected to this bucket from the left side, and identification information of a bucket which is connected to this bucket from the right side.

Figure 8:
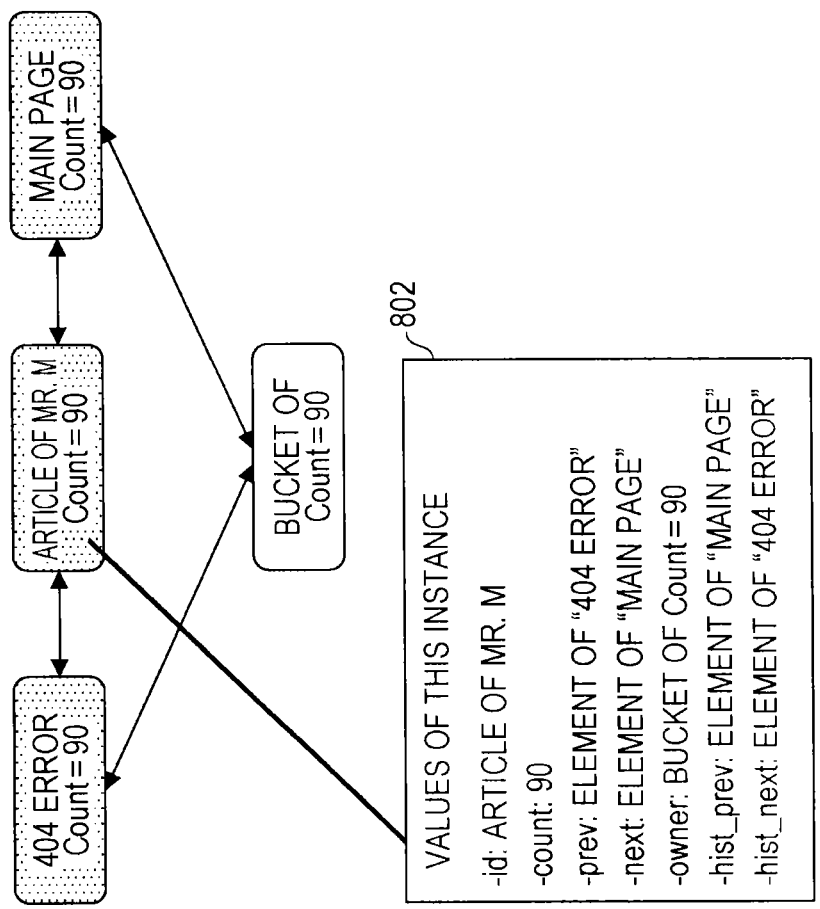
FIG. 8 is a diagram illustrating an example of an element, according to an embodiment.

Values of the instances depicted in FIGS. 8 and 9 are stored in the data storage unit 14.

Figure 10:
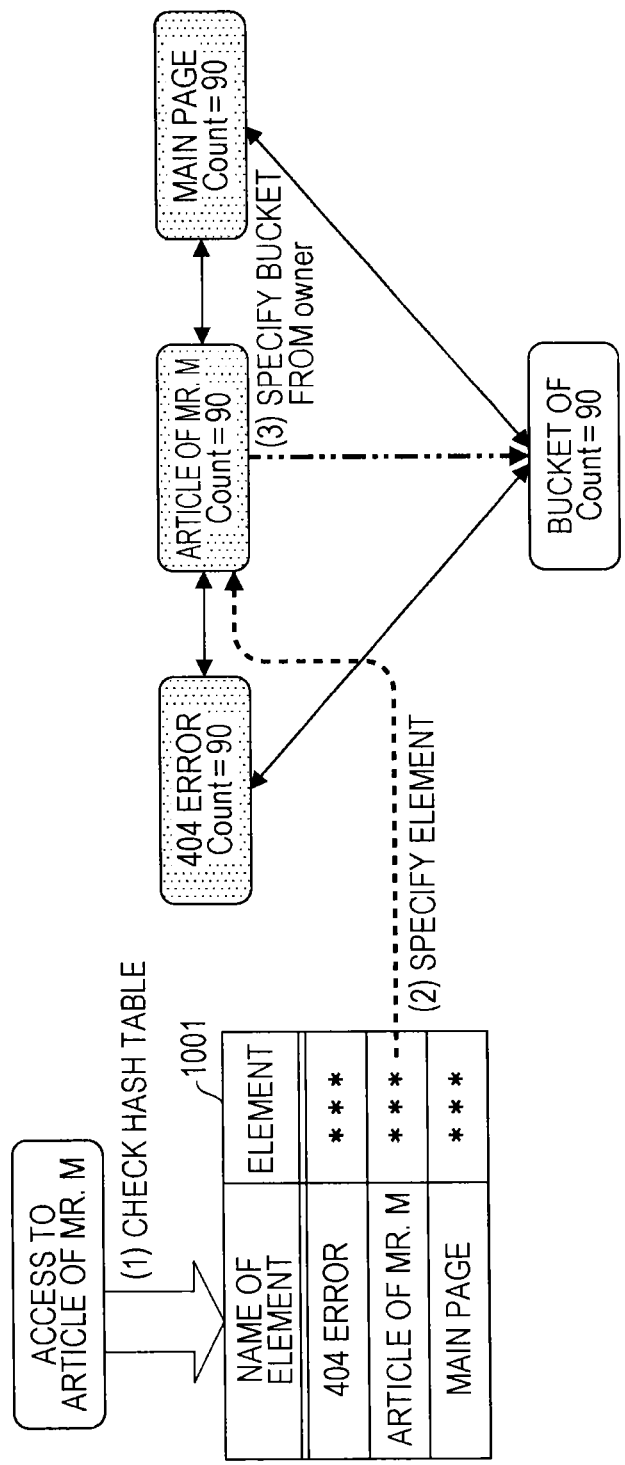
FIG. 10 is a diagram illustrating an example of a method for specifying an element and a bucket when data is accessed, according to an embodiment.

Here, "owner" is defined in FIG. 8, so as to find an element at high speed. This is described with reference to FIG. 10. As depicted in FIG. 10, when data is accessed, a hash table 1001 in which an element name (or identification information of data) and an element are associated with each other is checked ((1) in FIG. 10). The check of the hash table enables specifying of an element ((2) in FIG. 10). Then, it is possible to specify a bucket to which the element belongs ((3) in FIG. 10) by referring to a value of "owner" in the specified element. Here, since theoretically it is sufficient to search elements which are managed by a bucket one by one, "owner" may not have to be used. However, an order at this time is O (maximum number of elements) in the O notation, so that it takes exceedingly long time to find an element. Therefore, the above mentioned method is employed.

An operation of the server 1 is now described with reference to FIGS. 11 to 25. Processing which is performed for every unit time and processing which is performed when data is accessed are described with reference to FIGS. 11 to 22.

Figure 11:
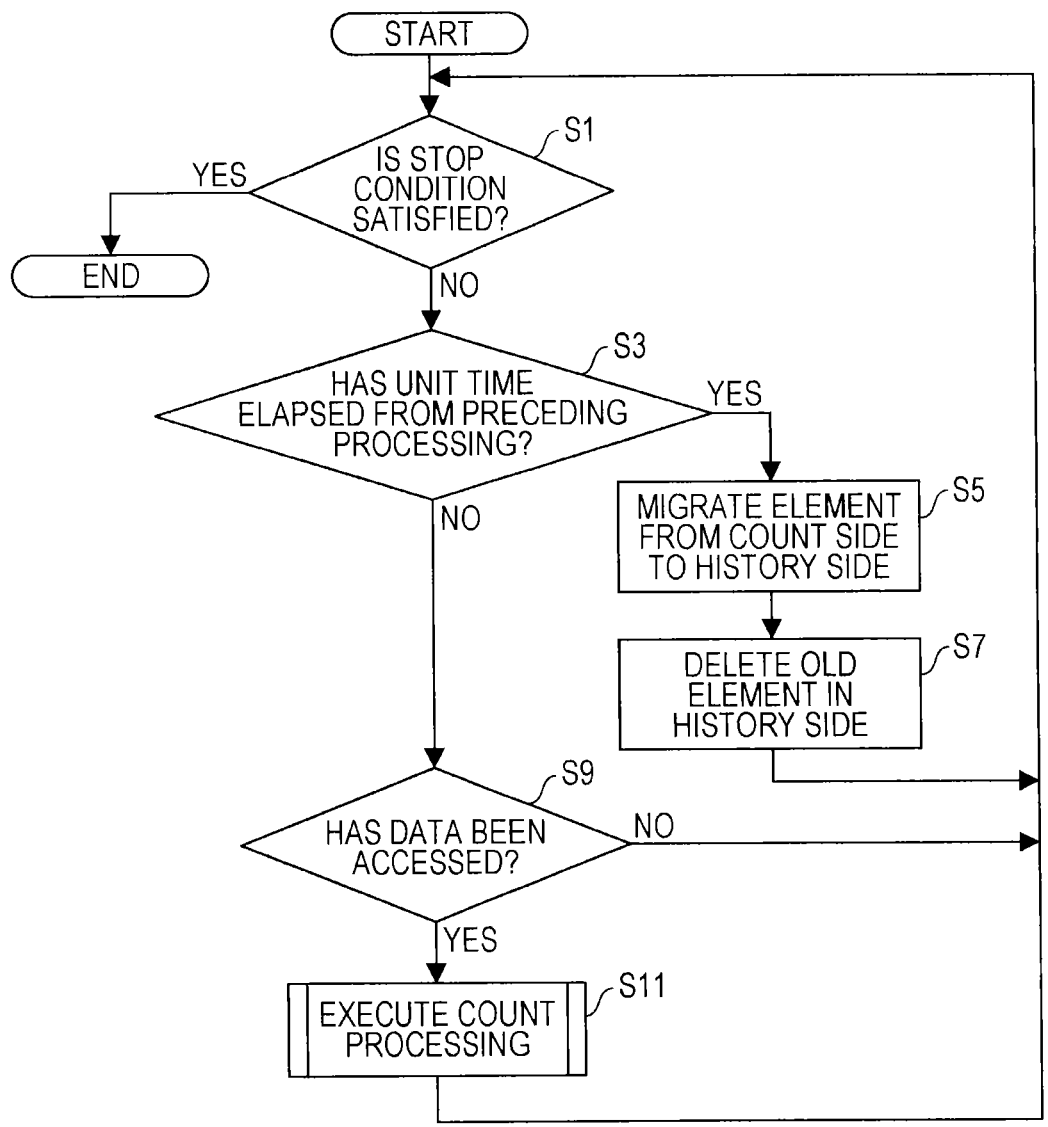
FIG. 11 is a diagram illustrating an example of an operational flowchart for main processing, according to an embodiment.

The migration unit 16 of the server 1 first determines whether a stop condition is satisfied (FIG. 11: step S1). The stop condition is a condition in which stop of the server 1 is instructed by a user, for example. When the stop condition is satisfied (YES in step S1), the processing is ended. On the other hand, when the stop condition is not satisfied (NO in step S1), the migration unit 16 determines whether unit time has elapsed from preceding processing (processing of steps S5 and S7, in this case) (step S3). When the migration unit 16 has been notified of the elapse of the unit time from the timer 17, the migration unit 16 determines that the unit time has elapsed from the preceding processing.

When the unit time has elapsed from the preceding processing (YES in step S3), the migration unit 16 migrates an element which belongs to the count side to the history side (step S5). Specifically, the migration unit 16 rewrites data, which is stored in the data storage unit 14, of an element belonging to the count side (a value related to a connecting relation, for example).

The migration unit 16 deletes data which is stored in the data storage unit 14 and related to an old element belonging to the history side (step S7). Then, the processing returns to the processing of step S1.

Figure 12:
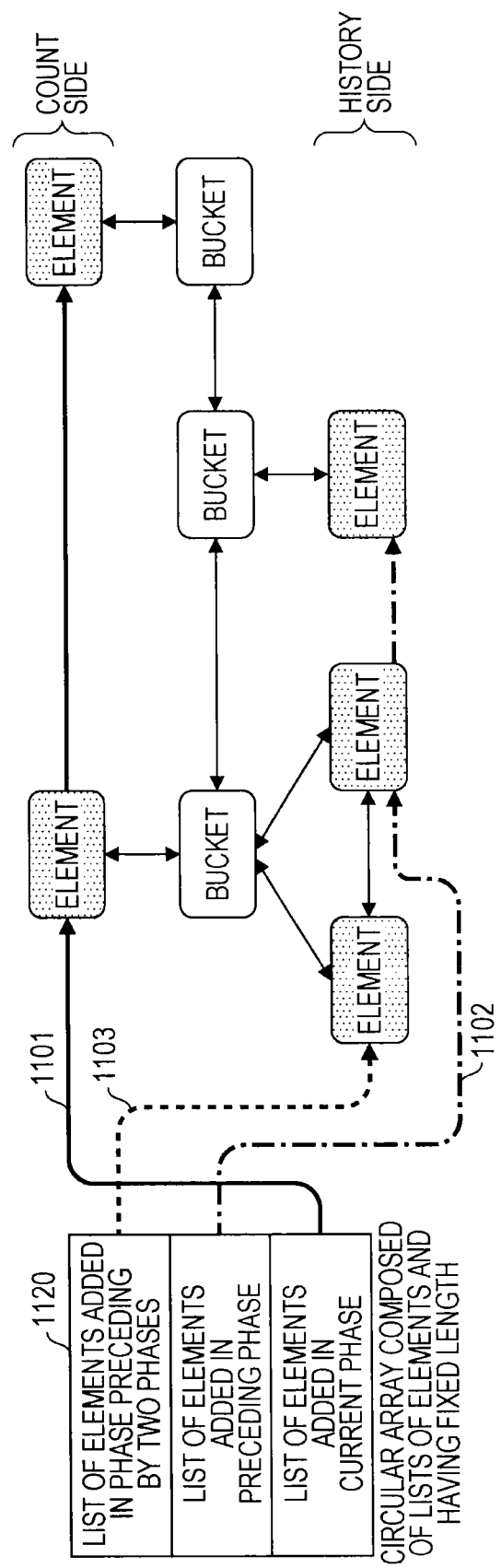
FIG. 12 is a diagram illustrating an example of lists of buckets and elements when performing migration of an element, according to an embodiment.
Figure 13:
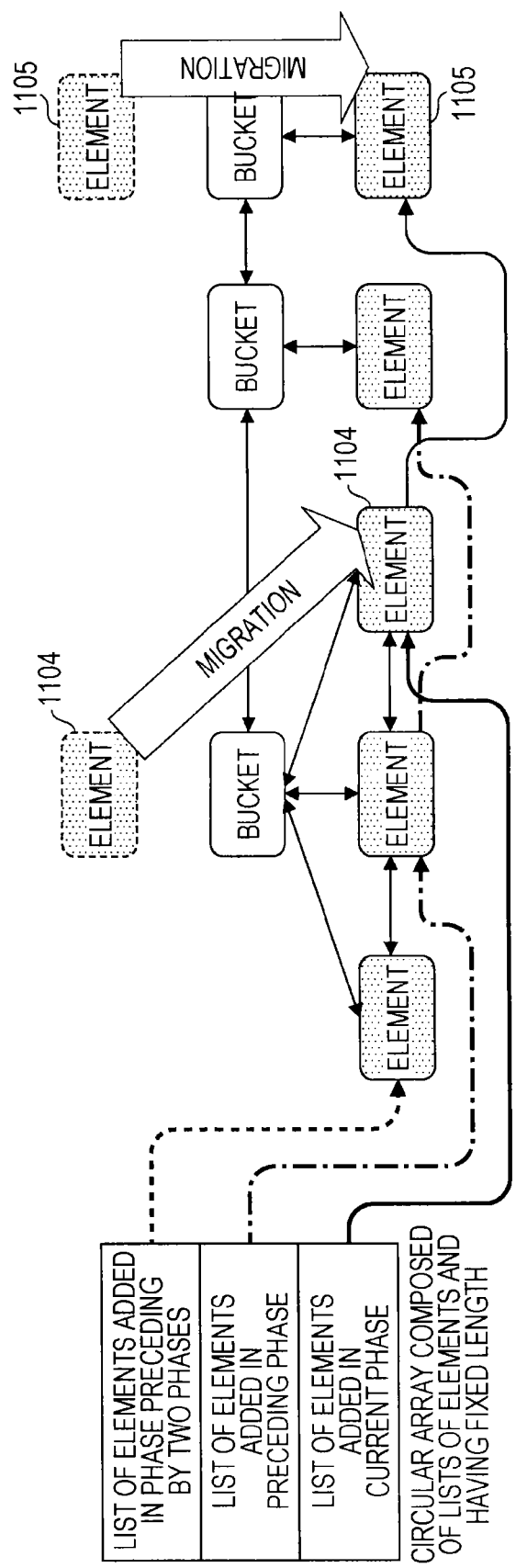
FIG. 13 is a diagram illustrating an example of lists of buckets and elements when performing migration of an element, according to an embodiment.

Migration of an element is described with reference to FIGS. 12 and 13. In the embodiment, the migration unit 16 and the update unit 13 manages a circular array which is composed of lists of elements and has a fixed length, such as a circular array 1120 of FIG. 12, in the data storage unit 14. In FIG. 12, elements connected by a solid line 1101 are elements which are included in a list of elements added in a current phase, elements connected by a dashed-dotted line 1102 are elements which are included in a list of elements added in a preceding phase, and elements connected by a dashed line 1103 are elements which are included in a list of elements added in a phase preceding by two phases. A "phase" represents a stage from time at which the migration unit 16 performs a piece of processing to time at which the migration unit 16 performs a next piece of processing (a length of this stage is unit time).

In step S5 of FIG. 11, the migration unit 16 migrates elements added in a current phase (elements 1104 and 1105 in the example of FIG. 13) to the history side as depicted in FIG.

13, for example. However, the migration unit 16 does not change the configuration of the lists illustrated in 1120 of FIG. 12 and maintains an order of elements.

Figure 14:
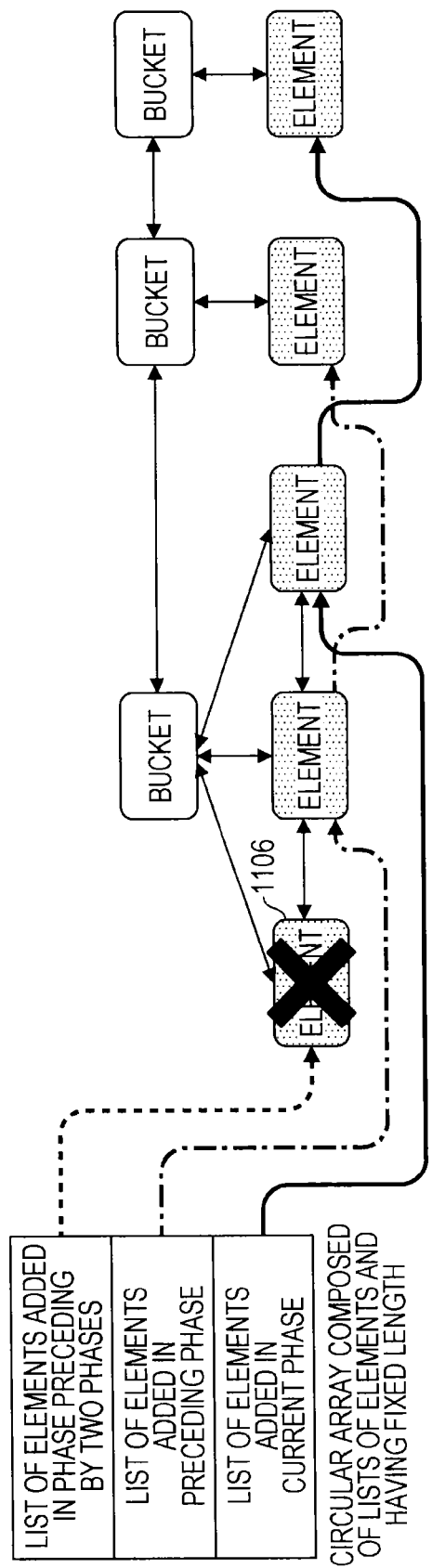
FIG. 14 is a diagram illustrating an example of lists of buckets and elements when performing deletion of an old element, according to an embodiment.
Figure 15:
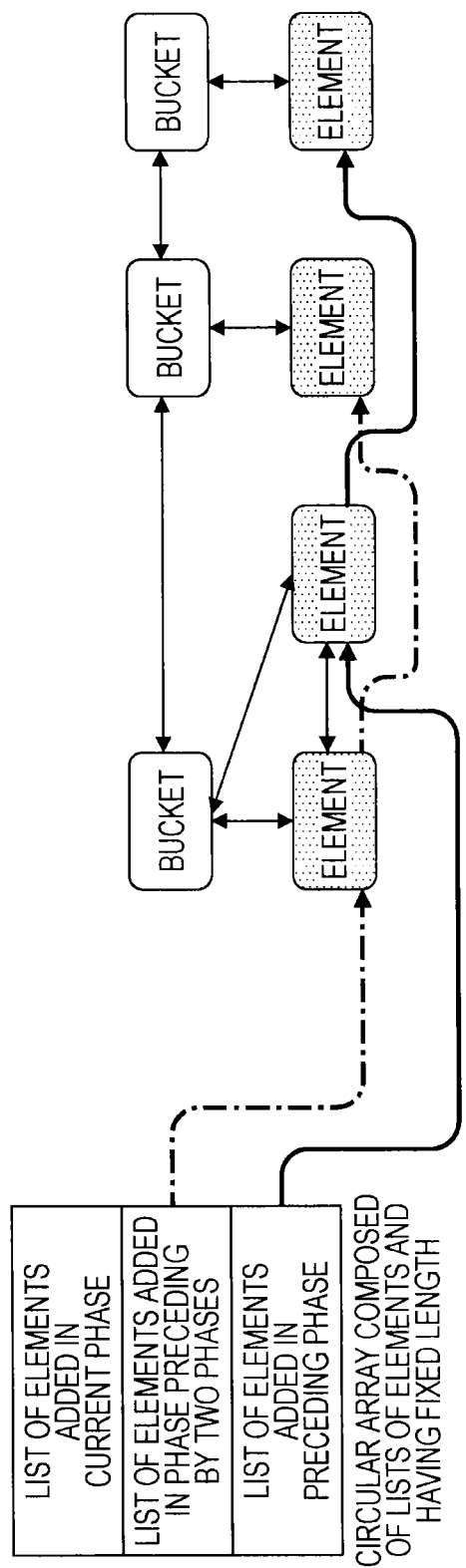
FIG. 15 is a diagram illustrating an example of lists of buckets and elements when performing deletion of an old element, according to an embodiment.

Deletion of an old element is described with reference to FIGS. 14 and 15. In the example of FIG. 14, it is assumed that an element which is added in a phase preceding by three or more phases is an old element. In this case, an element 1106 included in the list of elements added in a phase preceding by two phases next turns to an element which is included in a list of elements added in a phase preceding by three phases, thereby being deleted by the processing of step S7 of FIG. 11. When deletion of an old element is completed, a list of elements added in a current phase turns to a list of elements added in a preceding phase, and a list of elements added in a preceding phase turns to a list of elements added in a phase preceding by two phases, as depicted in FIG. 15. However, an order of elements in the list is not changed.

Figure 16:
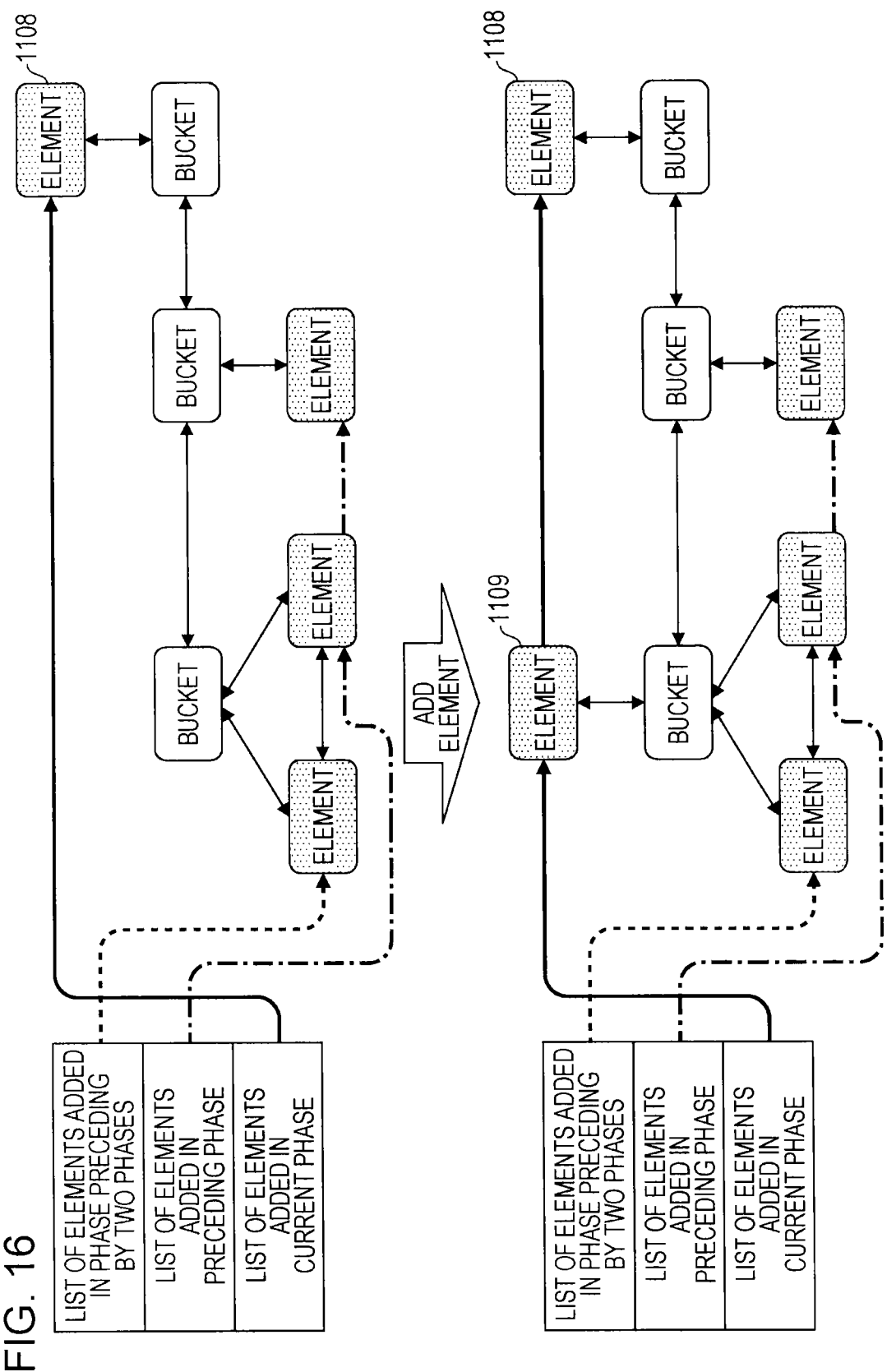
FIG. 16 is a diagram illustrating an example of management of a list when performing addition of an element, according to an embodiment.
Figure 17:
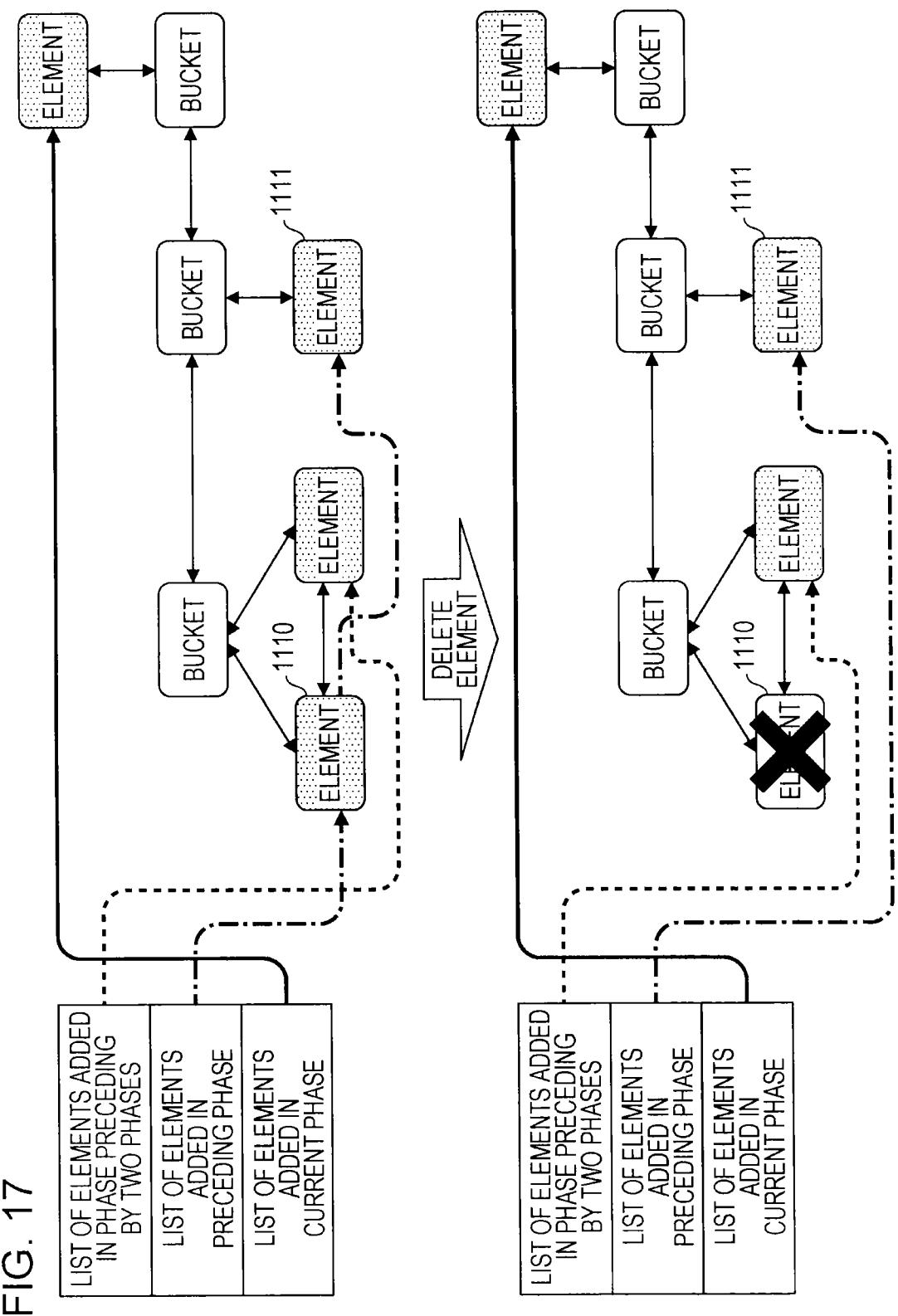
FIG. 17 is a diagram illustrating an example of management of a list when performing deletion of an element, according to an embodiment.

Another specific example of management of a list according to the embodiment is illustrated in FIGS. 16 and 17. FIG. 16 illustrates a specific example of management of a list of a case in which an element is added. In the example of FIG. 16, an element 1109 is added to a head of a list of elements added in a current phase. Since an element 1108 has been originally included in the list of elements added in the current phase, the element 1108 and the element 1109 are connected in the list after the addition of the element. Here, orders of elements in other lists are not changed.

FIG. 17 illustrates a specific example of management of a list of a case in which an element is deleted. In FIG. 17, an element 1110 which is included in a list of elements added in a preceding phase is deleted. In this case, an element 1111 which has been originally included in the list of elements added in the preceding phase becomes the head of this list. Here, orders of elements in other lists are not changed.

Referring back to the description of FIG. 11, when the unit time has not elapsed from the preceding processing (NO in step S3), the update unit 13 determines whether data held by the server 1 has been accessed (step S9). In step S9, the determination of the update unit 13 may be performed by determining whether or not a request has been received from the reception unit 11.

When the data has not been accessed (NO in step S9), data stored in the data storage unit 14 does not have to be updated and therefore, the processing returns to the processing of step S1. When the data has been accessed (YES in step S9), the update unit 13 executes count processing (step S11). The count processing is described with reference to FIGS. 18 to 22. In the count processing, data which has been accessed is represented as data D.

Figure 18:
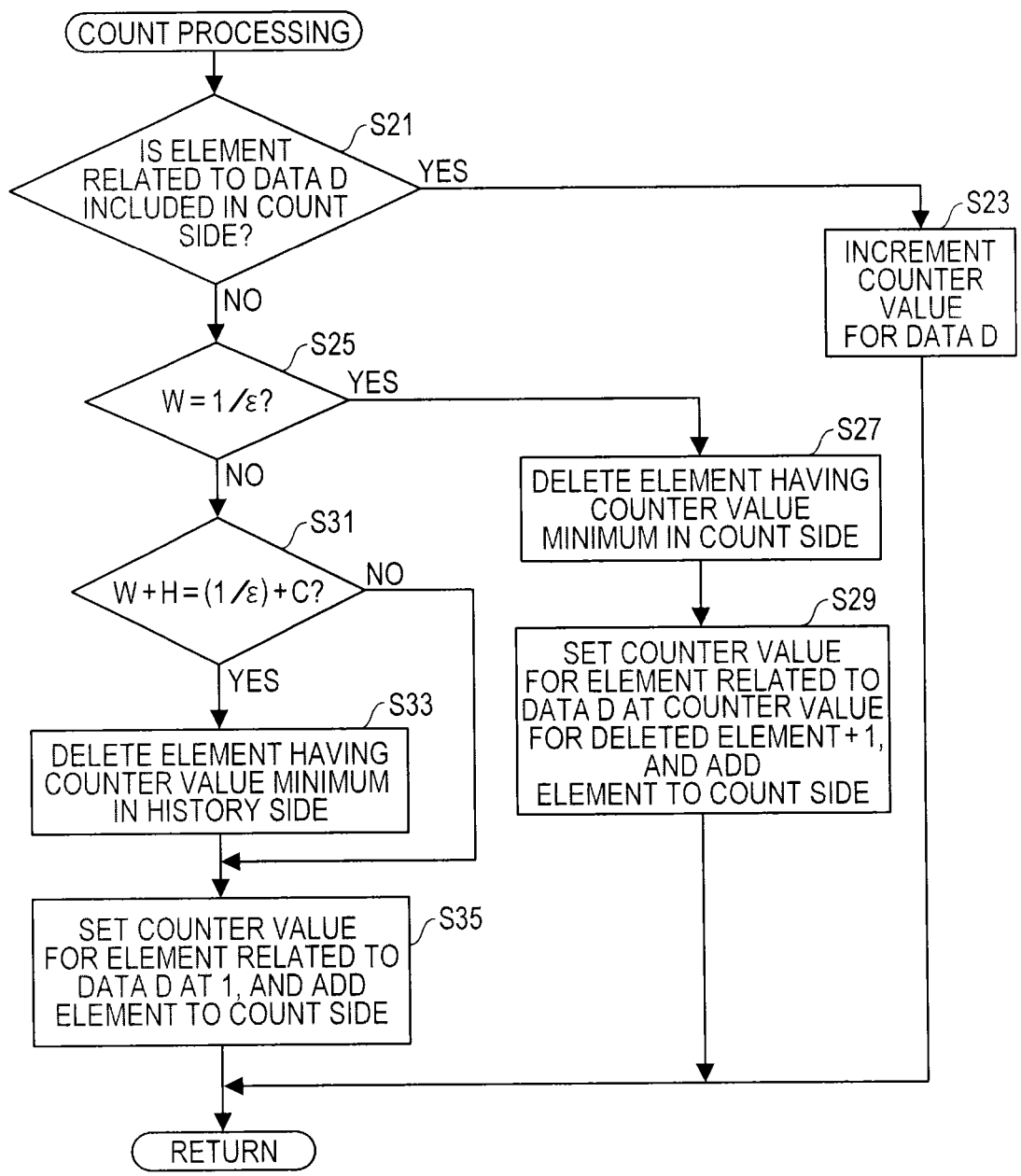
FIG. 18 is a diagram illustrating an example of an operational flowchart for count processing, according to an embodiment.

The update unit 13 determines whether or not an element related to the data D is included in the count side (FIG. 18: step S21). The determination of whether or not an element related to the data D is included in the count side may be performed by determining whether or not an element corresponding to the data D is included in the hash table depicted in FIG. 10, for example.

When the data D is included in the count side (YES in step S21), it is sufficient to update the element of the data D in the count side. Therefore, the update unit 13 increments a value of the counter for the data D, in the count side (step S23).

Figure 19:
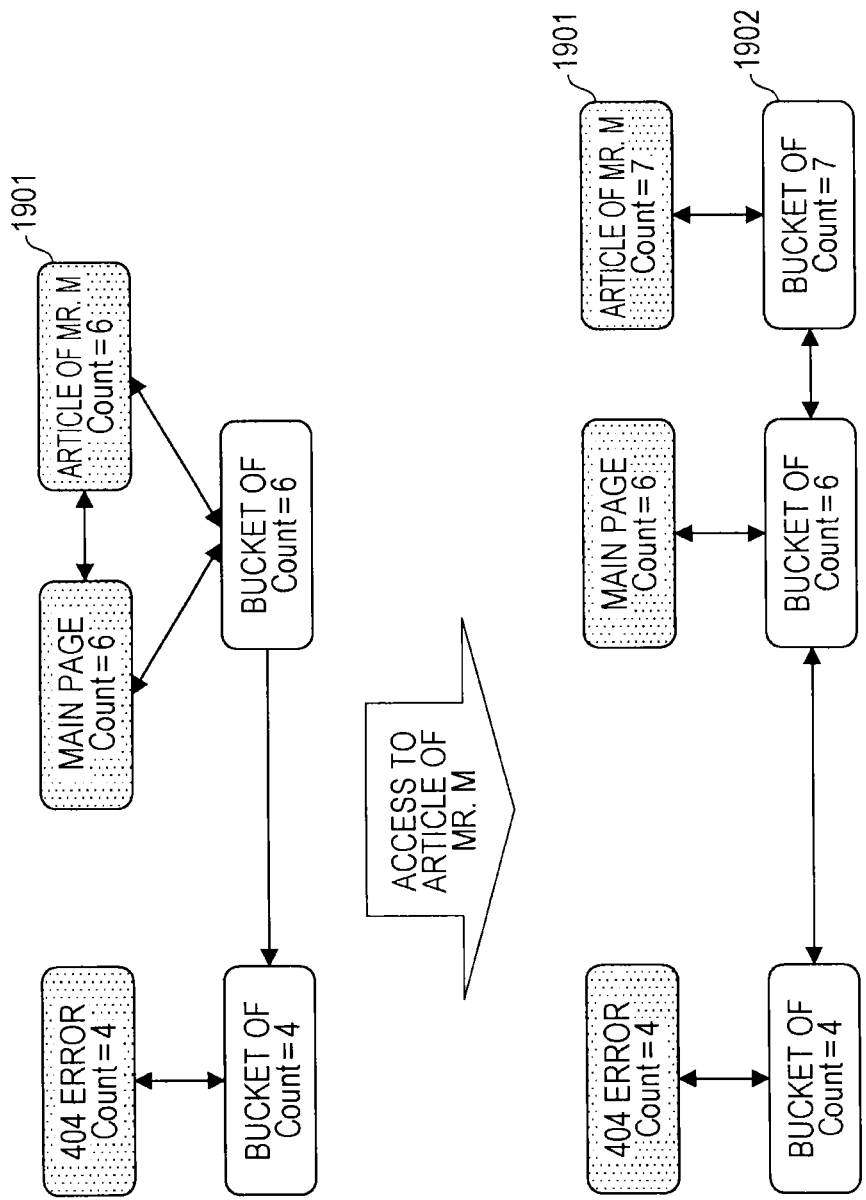
FIG. 19 is a diagram illustrating an example of change in lists when performing count processing, according to an embodiment.

The processing of step S23 is specifically described with reference to FIG. 19. Since elements belonging to the history side have no relation in step S23, the description of the history side is omitted in FIG. 19. In a case of a state depicted in the upper half of FIG. 19, it is assumed that data of "article of Mr. M" is accessed, for example. Here, an element for the data of "article of Mr. M" is an element 1901 included in the count side. Accordingly, a value of the counter for the element 1901 is incremented through the processing of step S23. Then, a state depicted in the lower half of FIG. 19 is obtained. The number of times of access for the data of "article of Mr. M" has been 6 times, but the number is updated to 7 times through the processing of step S23. Further, a bucket 1902 managing the element 1901 of which a value of the counter is 7 is added.

Referring back to the description of FIG. 18, when an element related to the data D is not included in the count side (NO in step S21), the update unit 13 determines whether $W=1/\epsilon$ is satisfied (step S25). Here, W denotes the number of elements which are included in the count side and $\epsilon$ denotes an error coefficient. $1/\epsilon$ represents an upper limit of the number of elements which are included in the count side. $1/\epsilon$ is a value about a few thousand, for example.

When $W=1/\epsilon$ is satisfied (YES in step S25), the update unit 13 deletes an element having a value of counter that is minimum in the count side, from the data storage unit 14 (step S27). Further, the update unit 13 sets a value of the counter for an element related to the data D, at a value obtained by adding 1 to a value of the counter for an element which has been deleted in step S27, and to add the element related to the data D to the count side (step S29).

Figure 20:
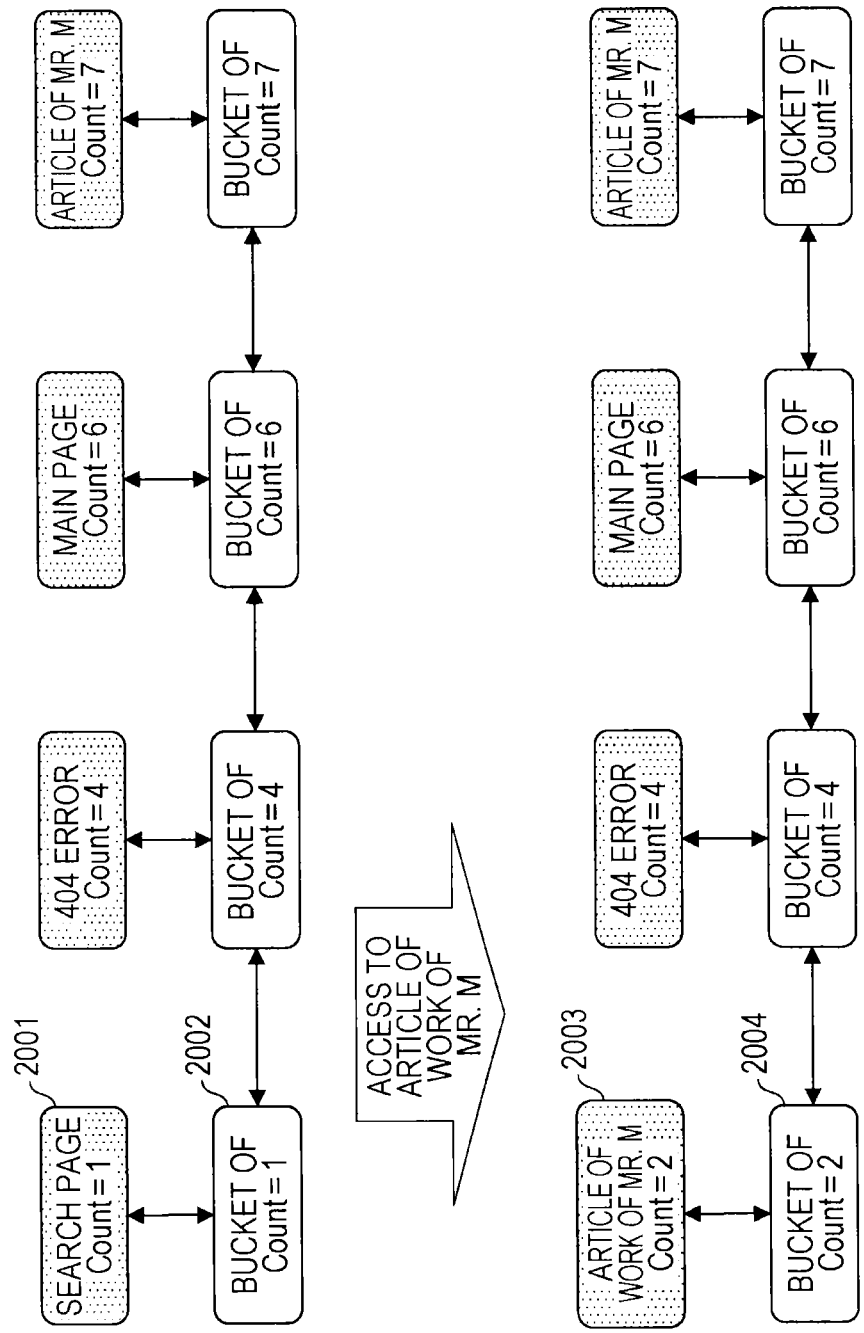
FIG. 20 is a diagram illustrating an example of change in lists when performing count processing, according to an embodiment.

The processing of steps S27 and S29 is specifically described with reference to FIG. 20. Since elements belonging to the history side have no relation in steps S27 and S29, the description of the history side is omitted in FIG. 20. In a case of a state depicted in the upper half of FIG. 20, it is assumed that data of "article of work of Mr. M" is accessed, for example. Here, an element related to the data of "article of work of Mr. M" is not included in the count side. Accordingly, an element 2001 having a value of the counter that is minimum in the count side is deleted through the processing of step S27. Further, an element related to the data of "article of work of Mr. M" is added to the count side through the processing of step S29. Here, a value of the counter for the added element is set at 2 which is obtained by adding 1 to a value of the counter for the deleted element, 1. A bucket 2002 for managing an element whose value of the counter is 1 is deleted, and a bucket 2004 for managing an element whose value of the counter is 2 is added. A state depicted in the lower half of FIG. 20 is obtained through these processing.

Referring back to the description of FIG. 18, when $W=1/\epsilon$ is not satisfied (No in step S25), the update unit 13 determines whether $W+H=(1/\epsilon)+C$ is satisfied (step S31). Here, H denotes the number of elements belonging to the history side and C denotes the number of elements remaining in the history side. C is a value about several dozen, for example, and is a sufficiently small value compared to $1/\epsilon$.

From the above-described definition, the maximum value of the number of elements belonging to the count side is $1/\epsilon$, and the maximum value of the number of elements belonging to the history side is $(1/\epsilon)+C$. Accordingly, elements whose values of the counter are within the top C remain in the history side.

When $W+H=(1/\epsilon)+C$ is not satisfied (NO in step S31), the update unit 13 set a value of the counter for an element related to the data D at 1, and adds the element related to the data D to the count side (step S35).

Figure 21:
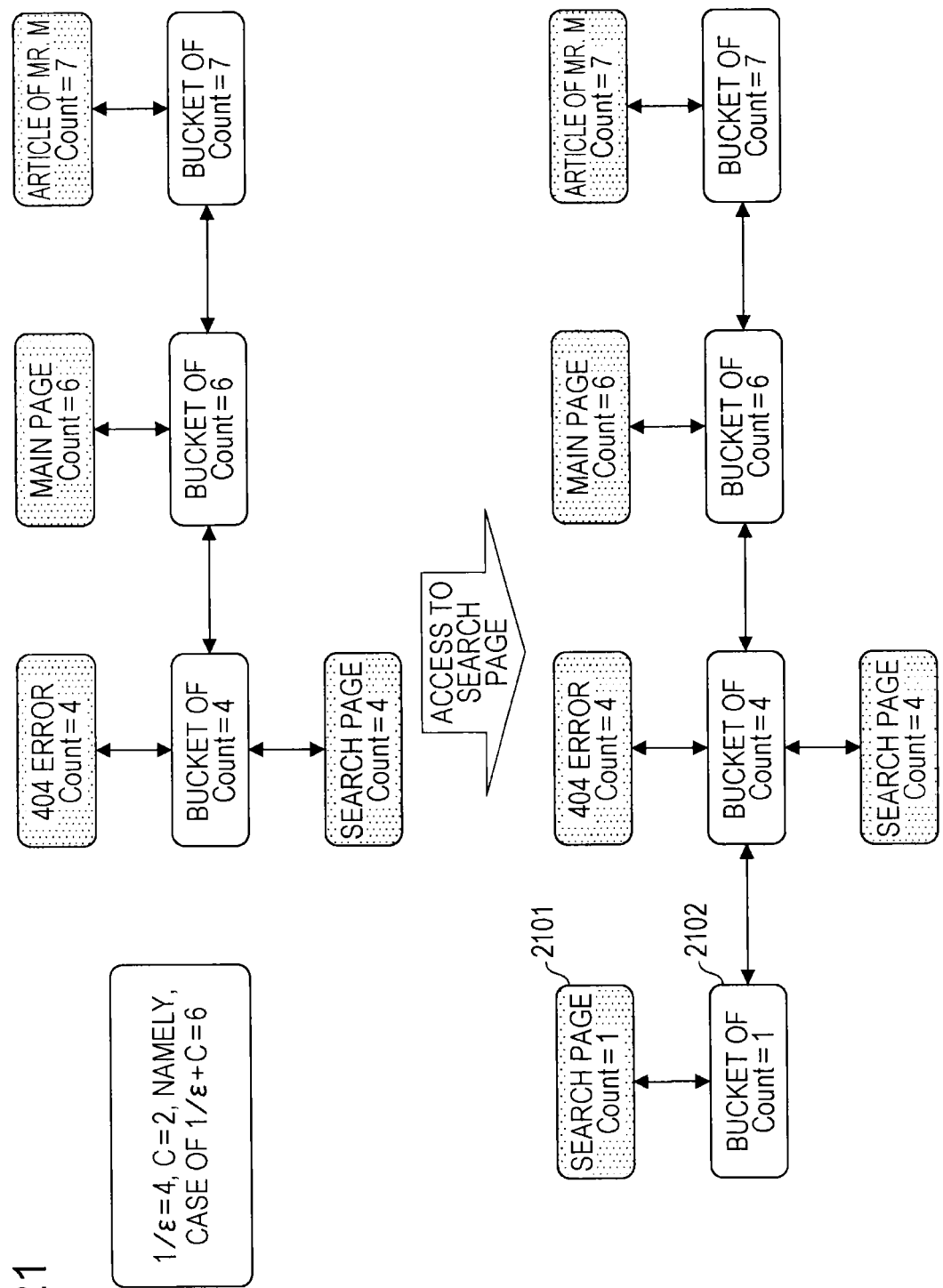
FIG. 21 is a diagram illustrating an example of change in lists when performing count processing, according to an embodiment.

The processing of a case going to the No root of step S31 is specifically described with reference to FIG. 21. In a case in which elements and buckets are in a state depicted in the upper half of FIG. 21, for example, it is assumed that $1/\epsilon=4$ and $C=2$, that is, $(1/\epsilon)+C=6$ is satisfied. In this case, a sum of the number of elements on the count side and the number of elements on the history side does not reach 6 which is the upper limit. Accordingly, an element 2101 related to data of "search page" is added to the count side through the processing of step S35. Here, a value of the counter for the added element is 1. Further, a bucket 2102 for managing an element whose value in the counter is 1 is added. Through these processing, a state depicted in the lower half of FIG. 21 is obtained.

When W+H=(1/ϵ)+C is satisfied (YES in step S31), the update unit 13 deletes an element having a counter value minimum in the history side from the data storage unit 14 (step S33). Further, the update unit 13 sets a value of the counter for the element related to the data D at 1, and adds the element related to the data D to the count side (step S35). Then, the processing is ended.

Figure 22:
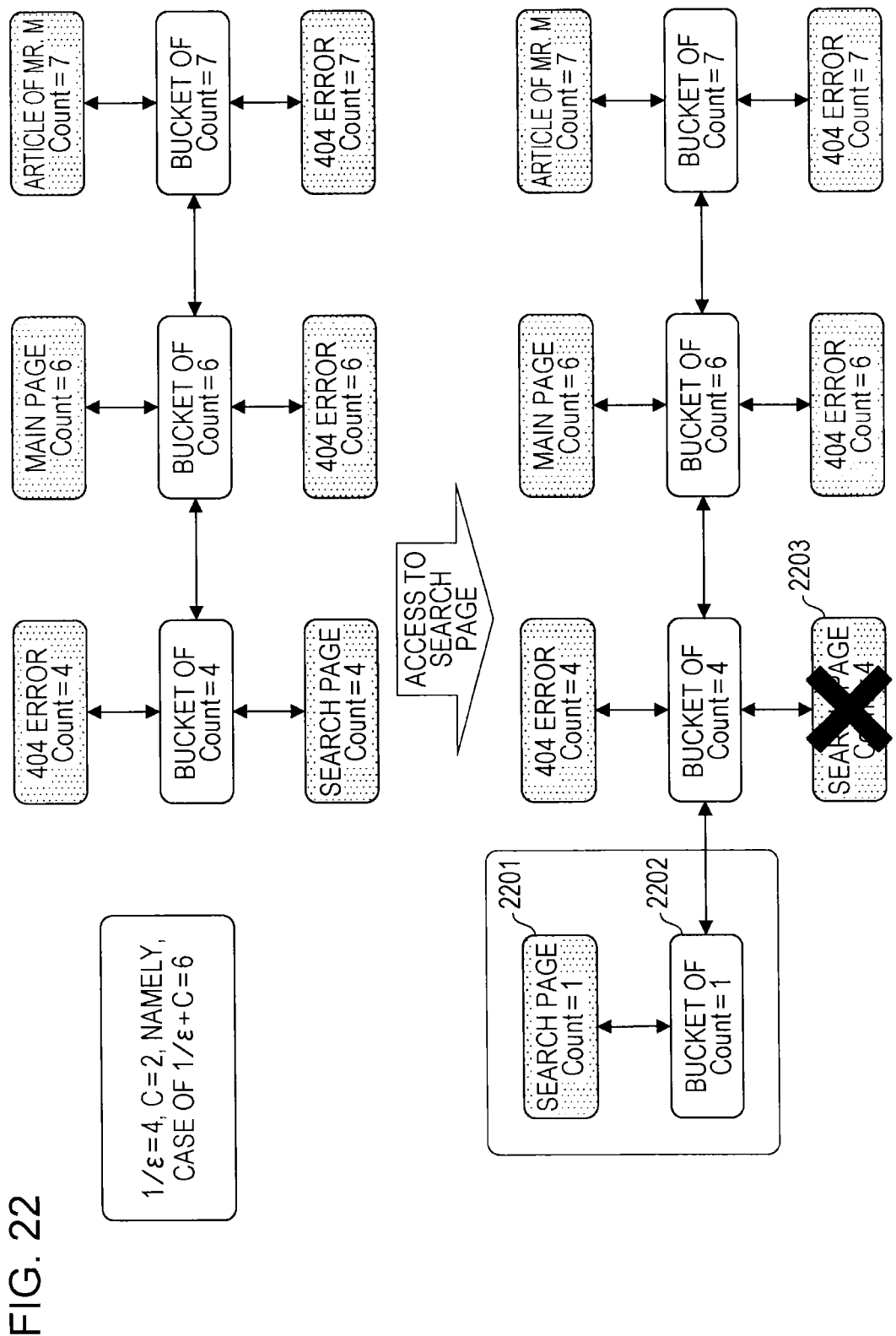
FIG. 22 is a diagram illustrating an example of change in lists when performing count processing, according to an embodiment.

The processing of a case going to the Yes root of step S31 is specifically described with reference to FIG. 22. In a case in which elements and buckets are in a state depicted in the upper half of FIG. 22, for example, it is assumed that 1/ϵ=4 and C=2, that is, (1/ϵ)+C=6 is satisfied. In this case, a sum of the number of elements on the count side and the number of elements on the history side reaches 6 which is the upper limit. Accordingly, an element 2203 having a counter value minimum in the history side is deleted through the processing of step S33. Further, an element 2201 related to data of "search page" is added to the count side through the processing of step S35. Here, a value of the counter for the added element is 1. Further, a bucket 2202 for managing an element whose counter value is 1 is added. Through these processing, a state depicted in the lower half of FIG. 22 is obtained.

As described above, the method of the embodiment in which the idea of the space-saving algorithm is incorporated enables high-speed execution of processing. Further, even in a case in which a wide variety of data such as big data are accessing objects, an upper limit of the number of elements is set at (1/ϵ)+C. Therefore, a used amount of resources stays constant. Further, even if a spike suddenly occurs after a long period of time elapses from the start of an operation of a system, data that has caused the spike may be detectable. This is because not the number of times of access from time of the operation start to current time but the number of times of access which is counted for every unit time is used.

Here, in a case in which a value of W+H reaches the upper limit, an element having the minimum counter value is deleted in the history side whenever a new element is added to the count side. Here, it is assumed that k denotes a coefficient for deciding an element which is considered old and T denotes a length of unit time. In this case, when the migration unit 16 performs processing regularly (that is, for every unit time), elements whose counter values are within the top C in a period from kT seconds before to T seconds before remain in the history side. At this time, since elements which have been generated from T seconds before to current time are staying in the count side, elements whose counter values are within the top C on the history side at a stage on which migration processing of elements are finished is same as elements whose counter values are within the top C from kT seconds before to current time.

Since the idea of the space-saving algorithm is incorporated, a value of the counter is slightly different from the actual number of access, but a value of the counter becomes approximately same as the number of times of access when 1/ϵ is appropriately selected. Accordingly, elements whose counter values are within the top C may be considered as elements whose access frequency during kT seconds is within the top C. The detection unit 15 becomes able to find data causing a spike by only searching these elements within the top C. Further, the number of elements is (1/ϵ)+C at a maximum. Therefore, even if variety of data is increased, a memory is not consumed proportionally, thereby realizing memory saving.

Processing for detecting data causing a spike is now described with reference to FIGS. 23 to 25.

The detection unit 15 first analyzes the number of times of access which is stored in the data storage unit 14 so as to determine whether or not there is data which satisfies a condition related to an occurrence of a spike (step S41). In step S41, the detection unit 15 determines whether or not a condition in which the number of times of access to specific data in the last unit time is equal to or larger than a predetermined threshold value is satisfied, for example. Further, the detection unit 15 determines whether or not a condition in which an increasing rate of the number of times of access to specific data is equal to or larger than a predetermined threshold value is satisfied, for example.

When there is no data which satisfies the condition related to an occurrence of a spike (NO in step S41), the processing returns to the processing of step S41. On the other hand, there is data which satisfies the condition related to an occurrence of a spike (YES in step S41), the detection unit 15 executes processing for load distribution (step S43). Then, the processing is ended.

The processing for load distribution is described with reference to FIGS. 24 and 25. In FIGS. 24 and 25, servers 2401 to 2409 are servers for holding data which is an accessing object in HDDs, and servers 2410 to 2412 are servers for allocating requests. As depicted in FIG. 24, it is assumed that there is news about death of Mr. M who is well-known, and an enormous number of people try to browse an article related to the death of Mr. M. Servers holding data of an article related to the death of Mr. M are the servers 2401, 2405, and 2409. Here, in a case in which access from user terminals is much heavier than assumption, responses of the servers 2401, 2405, and 2409 holding the data of the article related to the death of Mr. M are degraded. Then, it becomes difficult for users to browse the article related to the death of Mr. M.

Figure 23:
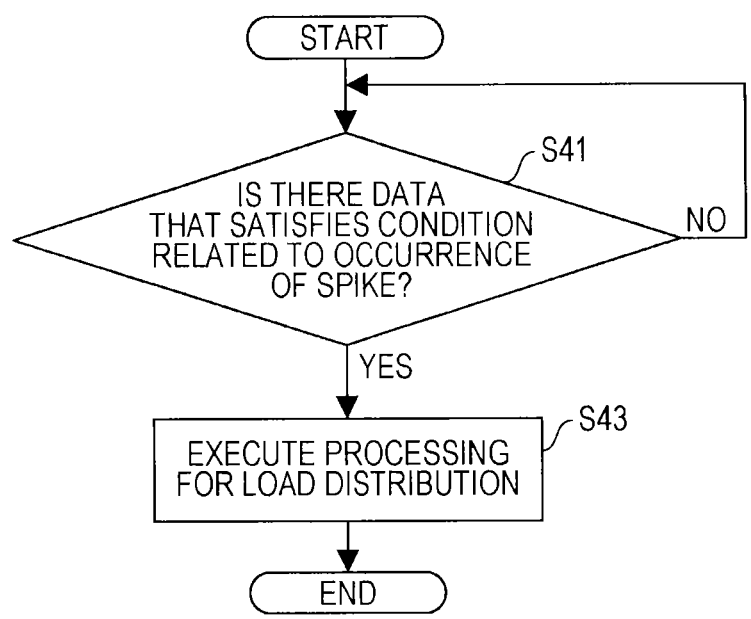
FIG. 23 is a diagram illustrating an example of an operational flowchart for detecting data causing a spike, according to an embodiment.
Figure 24:
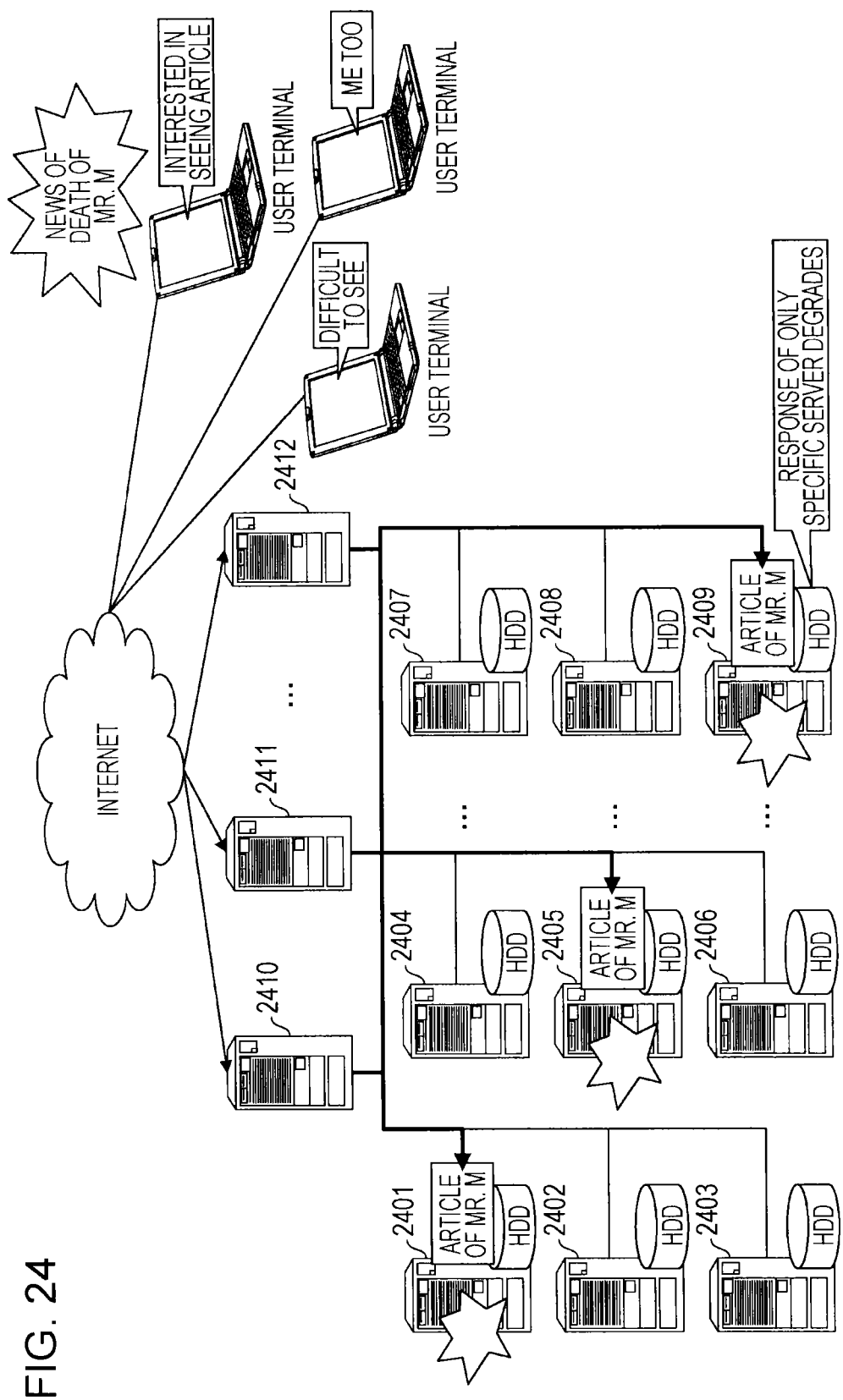
FIG. 24 is a schematic diagram illustrating an example of an operation when performing load distribution, according to an embodiment.
Figure 25:
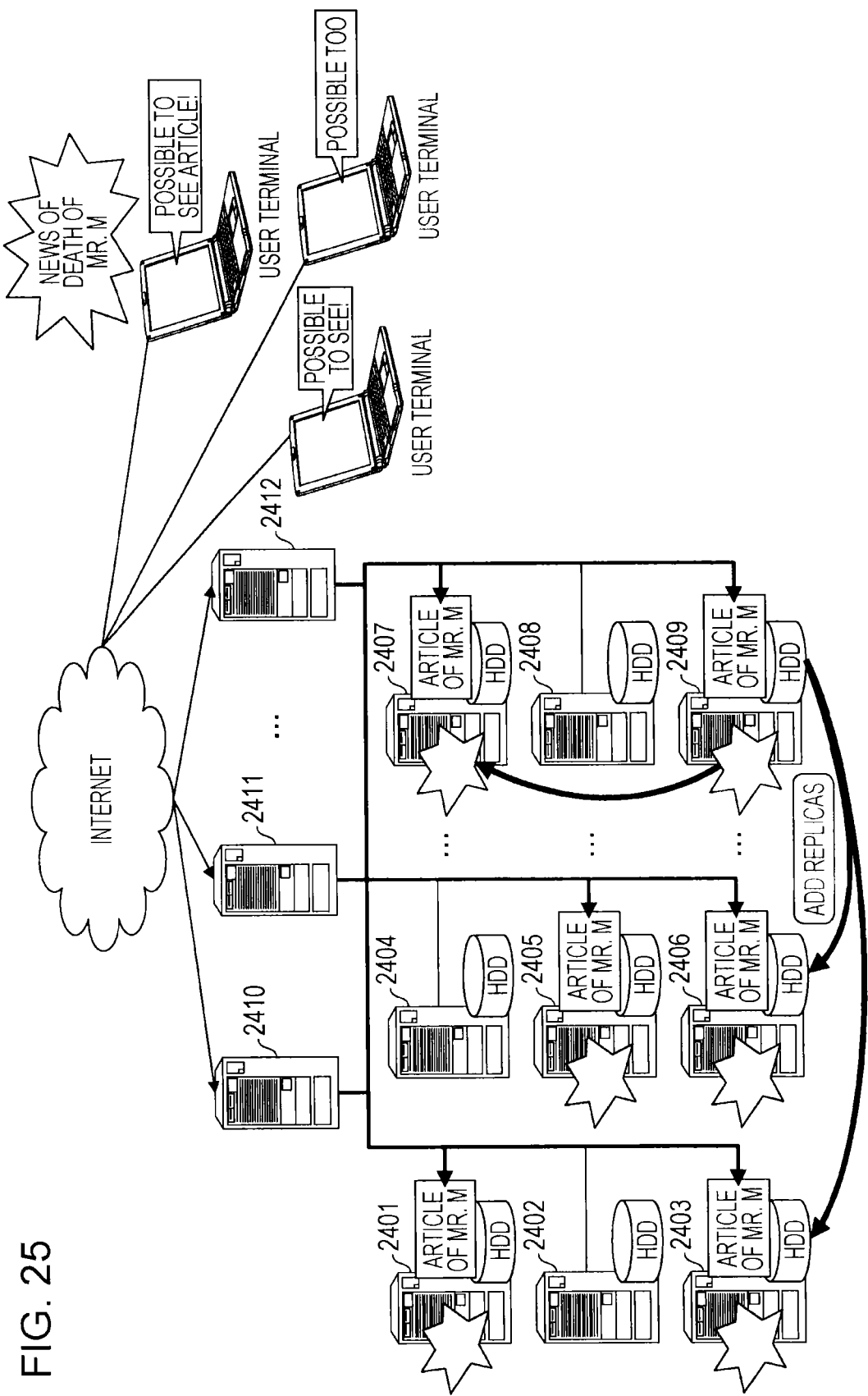
FIG. 25 is a schematic diagram illustrating an example of an operation when performing load distribution, according to an embodiment.

Therefore, in step S43 of FIG. 23 of the embodiment, processing illustrated in FIG. 25 is executed, for example. Specifically, the server 2409 which has detected the data, which has caused a spike, of the article related to the death of Mr. M requests other servers (servers 2403, 2406, and 2407 in this example) to add replicas of the corresponding data. In response to the request, the servers 2403, 2406, and 2407 add the data of the article related to the death of Mr. M to HDDs thereof. Further, the server 2409 requests the servers 2410 to 2412, which are configured to allocate requests, to allocate the request to the servers 2403, 2406, and 2407 as well. Accordingly, the request is allocated to the servers 2401, 2403, 2405, 2406, 2407, and 2409 and thus, the servers 2401, 2405, and 2409 recover from performance degradation. Then, the users become able to browse the article related to the death of Mr. M.

Here, the example in which performance degradation occurs in the server 2409 is illustrated. However, according to the embodiment, it is possible to detect data having caused a spike at high speed, thereby allowing load distribution to be performed before an occurrence of performance degradation.

As mentioned above, one embodiment of the present disclosure has been described, but embodiments of the present disclosure are not limited to the above-described embodiment. For example, the function block configuration of the server 1 which has been described above may not accord with the actual program module configuration.

Further, the configuration of each table which has been described above is an example, and each table does not have to have the above-described configuration. Further, in the processing flow, orders of processing may be exchanged as long as the same processing result is obtained. Further, processing may be executed in parallel.

When a first element is migrated from the count side to the history side, a second element of the history side may already exist in the bucket. In this case, when the second element of the history side is an element that has been originally staying in the history side, the first element to be migrated is connected to the tail end of a list. On the other hand, when the second element of the history side is an element that has been originally in the count side, the first element to be migrated is connected to the head of the list. Thus, an element which has been in the history side until then may approach the head of the list.

Here, the server 1 and the user terminals 31 to 33 which have been described above are computer devices. As depicted in FIG. 26, in the computer devices, a memory 2501, a central processing unit (CPU) 2503, a hard disk drive (HDD) 2505, a display control unit 2507 which is connected with a display device 2509, a drive device 2513 for a removable disk 2511, an input device 2515, and a communication control unit 2517 for connection to a network are connected to each other via a bus 2519. An operating system (OS) and an application program for executing the processing of the embodiment are stored in the HDD 2505. When the OS and the application program are executed by the CPU 2503, the OS and the application program are read from the HDD 2505 to the memory 2501. The CPU 2503 controls the display control unit 2507, the communication control unit 2517, and the drive device 2513 in accordance with a processing content of the application program, so as to allow the display control unit 2507, the communication control unit 2517, and the drive device 2513 to perform predetermined operations. Further, data in processing is mainly stored in the memory 2501, but the data may be stored in the HDD 2505. In the embodiment of the present disclosure, the application program for executing the above-described processing may be stored in the removable disk 2511, which is readable by a computer, to be distributed and is installed on the HDD 2505 from the drive device 2513. There is a case in which the application program is installed on the HDD 2505 through a network such as Internet and the communication control unit 2517. In such computer device, hardware such as the CPU 2503 and the memory 2501 described above, the OS, and a program such as an application program organically cooperate to realize the above-described various functions.

The embodiment described above is summarized as the following.

An access number management method according to the embodiment includes processing of (A) counting the number of times of access to data for every unit time and storing a management information element including the number of times of access and identification information of the data in a data storage unit, (B) deleting a management information element including the minimum number of times of access among management information elements that are stored in the data storage unit, when the number of management information elements that are stored in the data storage unit reaches a predetermined number, and (C) determining whether or not there is data that satisfies a condition related to rapid increase of access, by using the number of times of access, which is included in the management information elements that are stored in the data storage unit.

Accordingly, the number of times of access which is stored in the data storage unit is not the cumulative number of times of access, and a management information element related to data having the larger number of times of access remains in the data storage unit, thereby allowing data having causing a spike to be efficiently detected.

The above-described management information elements that are stored in the data storage unit may be divided into a first group, to which a management information element including the number of times of access in last unit time and identification information of data belongs, and a second group, to which a management information element including the number of times of access in unit time previous to the last unit time and identification information of data belongs. Further, in the above-described processing of deleting a management information element, (b1) when the number of management information elements that are stored in the data storage unit reaches the predetermined number, a management information element including the minimum number of times of access among management information elements that belong to the second group may be deleted. Accordingly, a management information element including the number of times of access in the last unit time is not deleted, so that the number of times of access in the last unit time is easily reflected to a result of detection.

The access number management method according to the embodiment may further include processing of (D) deleting a management information element including the minimum number of times of access among management information elements that belong to the first group, when the number of management information elements that belong to the first group reaches a second predetermined number. Accordingly, the data storage unit is not occupied by management information elements which belong to the first group.

The access number management method according to the embodiment may further include processing of (E) migrating a management information element that belongs to the first group to the second group for every unit time and deleting a management information element of which elapse of time after the management information element is stored in the data storage unit is equal to or longer than predetermined time. Further, in the above-described processing of storing the management information element in the data storage unit, (a1) a management information element including the number of times of access in the last unit time and identification information of data may be stored in a region of the first group in the data storage unit. Accordingly, it is possible to appropriately perform counting for every unit time and to guarantee avoidance of reference to an old management information element.

Here, it is possible to generate a program for allowing a computer to perform processing by the above-mentioned method, and the program is stored in a storage medium which is readable by a computer, such as a flexible disk, a CD-ROM, a magneto-optical disk, a semiconductor memory, and a hard disk, or a storage device. Here, an intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium stored therein a program for causing a computer to execute a process comprising:
   counting, for each piece of data, an access count indicating a number of times of access to the each piece of data for every unit time, and storing a management information element including the access count and identification information identifying the each piece of data, in a data storage unit;
   deleting, from a plurality of management information elements stored in the data storage unit, a first management information element that includes the access count having a value minimum among the plurality of management information elements, when a number of the plurality of management information elements reaches a first predetermined number; and
   determining whether there is a piece of data that satisfies a condition related to rapid increase of access, based on the access counts included in the plurality of management information elements stored in the data storage unit.

2. The non-transitory computer-readable recording medium of claim 1, wherein
   the plurality of management information elements are divided into first and second groups, the first group including first management information elements each including the access count and the identification information for pieces of data that have been accessed in last unit time, the second group including second management information elements each including the access count and the identification information for pieces of data accessed in unit time previous to the last unit time; and
   a second management information element that includes the access count having a value minimum among the second management information elements is deleted from the second group when a number of the plurality of management information elements being stored in the data storage unit reaches the first predetermined number.

3. The non-transitory computer-readable recording medium of claim 2, wherein the process further comprises:
   deleting, from the first group, a third management information element including the access count having a value minimum among the first management information elements, when a number of the first management information elements reaches a second predetermined number.

4. The non-transitory computer-readable recording medium of claim 2, wherein the process further comprises:
   migrating the first management information elements to the second group for every unit time and deleting a management information element of which elapse of time after the management information element is stored in the data storage unit is equal to or greater than predetermined time, wherein
   the management information element that includes the access count indicating a number of times of access to data in the last unit time is stored in a region that is set for the first group in the data storage unit.

5. An apparatus for managing data access count, the apparatus comprising:
   a memory configured to store a plurality of management information elements; and
   a processor configured:
   to count, for each piece of data, an access count indicating a number of times of access to the each piece of data for every unit time so as to store, in the memory, a management information element including the access count and identification information identifying the each piece of data,
   to delete, from the plurality of management information elements stored in the memory, a first management information element that includes the access count having a value minimum among the plurality of management information elements, when a number of the plurality of management information elements reaches a predetermined number, and
   to determine whether there is a piece of data that satisfies a condition related to rapid increase of access, based on the access counts included in the plurality of management information elements.

6. A method for managing data access count, the method comprising:
   counting, for each piece of data, an access count indicating a number of times of access to the each piece of data for every unit time so as to store, in a memory, a management information element including the access count and identification information identifying the each piece of data;
   deleting, from a plurality of management information elements stored in the memory, a first management information element that includes the access count having a value minimum among the plurality of management information elements, when a number of the plurality of management information elements reaches a predetermined number; and
   determining whether there is a piece of data that satisfies a condition related to rapid increase of access, based on the access counts included in the plurality of management information elements.

7. The apparatus of claim 5, wherein
   the plurality of management information elements are divided into first and second groups, the first group including first management information elements each including the access count and the identification information for pieces of data that have been accessed in last unit time, the second group including second management information elements each including the access count and the identification information for pieces of data accessed in unit time previous to the last unit time; and
   a second management information element that includes the access count having a value minimum among the second management information elements is deleted from the second group when a number of the plurality of management information elements being stored in the memory reaches the first predetermined number.

8. The apparatus of claim 7, wherein
   the processor is further configured to delete, from the first group, a third management information element including the access count having a value minimum among the first management information elements, when a number of the first management information elements reaches a second predetermined number.

9. The apparatus of claim 7, wherein
   the processor is further configured to migrate the first management information elements to the second group for every unit time and deleting a management information element of which elapse of time after the management information element is stored in the memory is equal to or greater than predetermined time; and
   the management information element that includes the access count indicating a number of times of access to data in the last unit time is stored in a region that is set for the first group in the memory.

10. The method of claim 6, wherein the plurality of management information elements are divided into first and second groups, the first group including first management information elements each including the access count and the identification information for pieces of data that have been accessed in last unit time, the second group including second management information elements each including the access count and the identification information for pieces of data accessed in unit time previous to the last unit time; and a second management information element that includes the access count having a value minimum among the second management information elements is deleted from the second group when a number of the plurality of management information elements being stored in the memory reaches the first predetermined number.

11. The method of claim 10, further comprising:

deleting, from the first group, a third management information element including the access count having a value minimum among the first management information elements, when a number of the first management information elements reaches a second predetermined number.

12. The method of claim 10, further comprising:

migrating the first management information elements to the second group for every unit time and deleting a management information element of which elapse of time after the management information element is stored in the memory is equal to or greater than predetermined time, wherein the management information element that includes the access count indicating a number of times of access to data in the last unit time is stored in a region that is set for the first group in the memory.

\* \* \* \* \*